(12) United States Patent
Belser

(10) Patent No.: US 6,529,460 B1
(45) Date of Patent: Mar. 4, 2003

(54) DETECTION OF PULSE PEAK INSTANCE AND AMPLITUDE IN A STORAGE DRIVE

(75) Inventor: Karl A. Belser, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/240,954

(22) Filed: Jan. 29, 1999

Related U.S. Application Data

(63) Continuation-in-part of application No. 09/132,962, filed on Aug. 12, 1998, now Pat. No. 6,185,174.
(60) Provisional application No. 60/073,284, filed on Jan. 31, 1998, and provisional application No. 60/108,367, filed on Nov. 13, 1998.

(51) Int. Cl.$^7$ .................................................. G11B 7/00
(52) U.S. Cl. ............................... 369/59.21; 369/44.34; 369/124.05
(58) Field of Search ..................... 369/124.05, 124.15, 369/124.36, 59.22, 59.21, 44.29, 53.41, 44.35, 44.36, 53.42, 30.22, 44.28, 47.46, 53.31, 44.34

(56) References Cited

U.S. PATENT DOCUMENTS

| | | | |
|---|---|---|---|
| 5,256,965 A | * 10/1993 | Nomura | 369/53.41 |
| 5,321,559 A | 6/1994 | Nguyen et al. | 360/46 |
| 5,455,813 A | * 10/1995 | Hayashi | 369/59.21 |
| 5,508,993 A | 4/1996 | Hayashi et al. | 369/59.22 |
| 5,523,987 A | 6/1996 | Muto | 369/30.22 |
| 5,604,724 A | * 2/1997 | Shiokawa | 369/59.22 |
| 5,668,678 A | 9/1997 | Reed et al. | 360/51 |
| 5,796,687 A | * 8/1998 | Baba | 369/44.29 |

FOREIGN PATENT DOCUMENTS

| | | |
|---|---|---|
| EP | 0300826 A2 | 1/1989 |
| EP | 0 521 646 A1 | 1/1993 |
| EP | 0 652 559 A2 | 5/1995 |
| GB | 2269727 | 2/1994 |
| WO | WO93/23941 | 11/1993 |

OTHER PUBLICATIONS

C.M. Melas, P. Sutardja, "An Asychronous Fully Digital Channel For Magnetic Recording" Nov. 28, 1994, IEEE Globecom, SanFransisco, pp. 1144–1147.

* cited by examiner

*Primary Examiner*—W. R. Young
*Assistant Examiner*—Kim-Kwok Chu
(74) *Attorney, Agent, or Firm*—Kirk A. Cesari; Derek J. Berger

(57) ABSTRACT

A method of pre-processing sampled data prior to estimating the peak amplitude of a pulse includes averaging of two adjacent sample values. Pre-processing makes the peak amplitude estimation less sensitive to the sampling phase relative to the peak position and consequently allows for the use of a lower sampling period relative to the full-width-half-maximum pulse width for a given peak estimation accuracy. The method incorporates a step in which a base line offset signal is subtracted from an estimated peak value, and multiplying the consequent pulse peak amplitude estimate by a predetermined constant in order to compensate for a systematic change in a final peak amplitude estimate. The multiplying constant may have a value derived from estimated peak values of other detected pulses in order to compensate for a systematic change in the peak amplitude estimate. Offsets in a position error signal derived from such pulses are eliminated by subtracting the estimated peak amplitudes of a pair of proximate (spatially and temporally related) pulses. The difference of another pair of proximate pulses is used to estimate the maximum peak amplitude of each pulse. A position error signal difference is divided by a maximum peak amplitude difference to generate a normalized position error signal that compensates for systematic changes of pulse signal amplitude estimate caused by adjacent sample averaging.

17 Claims, 12 Drawing Sheets

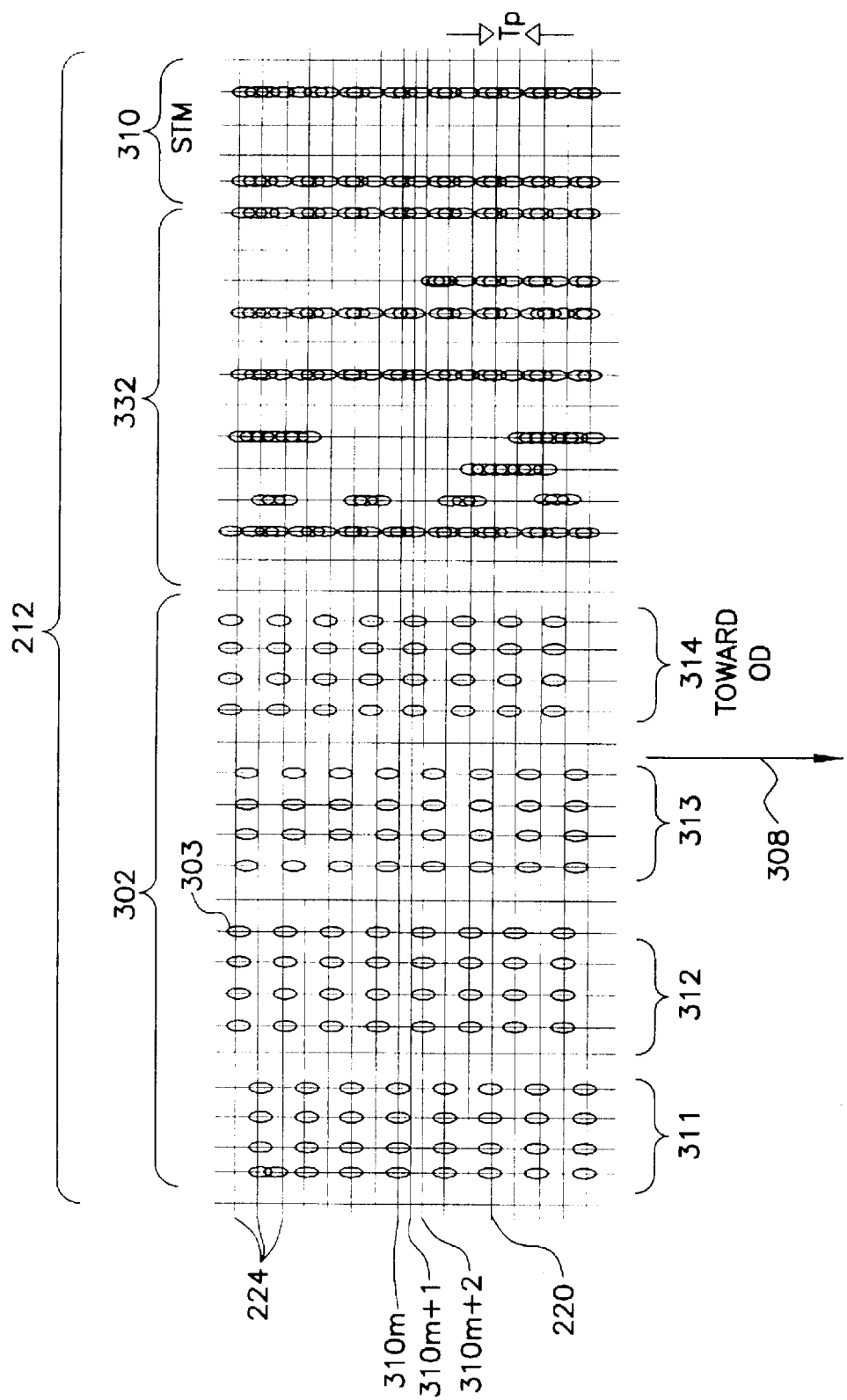

DETECTION OF PULSE PEAK INSTANCE AND AMPLITUDE IN A STORAGE DRIVE

RELATED APPLICATIONS

This application is related to and claims priority from commonly assigned Provisional Application No. 60/073,284, filed on Jan. 31, 1998 and Provisional Application No. 60/108,367, filed on Nov. 13, 1998, and is also a CIP of U.S. application Ser. No. 09/132,962, filed Aug. 12, 1998, now U.S. Pat. No. 6,185,174 issued Feb. 6, 2001, both of which are incorporated herein by reference.

FIELD OF THE INVENTION

The invention relates to an improvement in a method and system for estimating pulse peak amplitudes and pulse peak instances (the times or instants at which the amplitude of pulse peak occurs) of serial analog pulse sequences in which the pulses have varying amplitude, pulse widths and base levels in the presence of noise. Specifically, this is a simple but elegant digital processing approach applied to determining pulse peak amplitudes and peak instances of data pulses recovered from stored data retrieved from magneto-optical (MO) drives.

BACKGROUND

With respect to parent case Ser. No. 09/132,962 referenced above and incorporated herein by reference, there is disclosed a typical disk with servo and data sectors. The servo sector is described to have a particular architecture, i.e., a physical arrangement or pattern, of data pits, grouped into patterns. The patterns define radial servo-timing-marks (STM) marks, formed of contiguous pits of constant size between circular inner diameter ID and outer diameter OD boundaries; the patterns form data track and servo sector address marks and Position-Error-Sensing (PES) marks.

In the system of Ser. No. 09/132,962, data may be modulated by pit position modulation. Therefore, the data pit and laser spot size must be about the same size to keep pulse amplitude about the same. Returned signal pulses have a narrow full width half height maximum FWHM pulse width at the OD and a wide pulse width at the ID. The circumferential spacing between radii in the servo sector is wider at the OD than at the ID. The pits toward the OD are spaced farther apart laterally than the pits toward the ID, even though they have the same width.

With regard to FIGS. 6a and 6b in the present application, typical signal pulses that may be recovered from a disk in drive system are depicted. In a typical servo sector, the first digital data to be recovered are the STM pulses. Pulses in such systems exhibit variation in pulse width, peak amplitude, base line displacement from reference zero level, and noise on the waveform.

With regard to FIG. 4a in the present application, some characteristics of disk drive data pulses not treated by the disclosure Ser. No. 09/132,962 are shown. A signal pulse 452 recovered from an inside data (ID) track has a wider pulse width ID PW 460 than a pulse width OD PW 462 from a signal pulse recovered from an outside (OD) track OD pulse 454. Even though the peak amplitudes Apj(ID) 464 and Apj(OD) 466 of the ID and OD pulses may be the same, OD PW 462 is narrower than ID PW 460 due to the higher relative speed of the data bit and the read head toward the perimeter of the disk. Variation is also typical in the level of background reflectance which corresponds to the base signal level Base Line1 470. This is indicated by a lower base signal level Base Line2 472. The base line signal level Base Line1 470 appears as an offset β in the signal level, from a zero level reference line 474. The maximum pulse deflections from the Base Line 470 represent the peak amplitude of the pulses, i.e., Apj(ID) 464 for the ID pulse and Apj(OD) 466 for the OD pulse. With component aging and disk contamination build up over time, Apj(ID) 464 and Apj(OD) 466 also decrease. This is indicated by the dashed lines of FIG. 4a in the present application. Digital processing of the signals ID pulse 452 and OD pulse 454 require sampling of the signals with an analog to digital converter at clock tick, k, and with a sufficiently small sample period 480, with a analog-to-digital conversion device having a sampling range 484 sufficiently large to cover the Base Line 470 expected. Random system noise 486 on the pulse signals ID pulse 452 and OD pulse 454 adds quantizing noise to any digital signal processing performed by the system 100.

With regard to Ser. No. 09/132,962, a pulse data recovery system is used in a magneto-optic disk drive. A laser spot is directed to a disk surface from a read/write head. Light reflected from the disk surface is received by the head and processed by a signal channel. The magnitude of the reflected signal from the disk surface is a constant (a base line level from a zero level reference) where the surface is flat. Pits formed in the disk surface during a mastering process cause the reflected signal near a pit to decrease as the laser spot passes over the pit edge because of destructive interference.

The resulting magnitude variation from a constant base value to a minimum peak and back to the base value is detected as a pulse signal. Achieving maximum peak pulse amplitude depends on having pit width and spot width of similar size. The pit width can be optimized for maximum signal robustness to width variations by diffraction modeling, One typical case has a pit size of about 350 nm and a 550 nm lambda wavelength laser full width half maximum (FWHM) spot size of 660 nm. The detected pulse width from the reflection of, an illuminating laser beam returned from a pit on the disk surface is related to the size of the laser spot and the size of the pit. Since pits near the OD are traveling at a higher linear speed (constant angular velocity at a greater radius) than those at the ID, the data pulse widths at the OD are correspondingly narrower. As the disc size and rotation speed are increased to achieve greater data capacity and data transfer rates, the difference between the detected pulse widths near the ID and near the OD becomes greater. In a typical application this could lead to a ratio of pulse widths of 2:1 or greater.

In Ser. No. 09/132,962, a digital signal processing channel (PDC) for recovering peak pulse amplitude and peak pulse instance is disclosed. The PDC is an invention of a digital circuit implementation of a pulse detection method and system using quadratic interpolation, peak amplitude estimation. The mariner of how the previous PDC works in combination with a Pulse Peak Synchronizer (PPS), a Servo Timing Mark Detector (STMD), a servo sector architecture, and cooperating system electronics (DDCS) is briefly summarized here.

The PDC invention of Ser. No. 09/132,962 provides an estimate, Ep(j), for the peak amplitude Ap(j) and an estimate, Toffset, for the offset of the peak instance tpj of a detected pulse from a sampling instance, e.g., a sampling clock SYSCLK. The estimates Ep(j) and Toffset, relative to the center sample of a multi-sample frame, are derived from an equation for a curve fitting parabola when the curve fitting parabola is fit to three adjacent samples of a respective data pulse. When the amplitude of a center sample is greater than or equal to the amplitude of one of the adjacent samples and is greater than the amplitude of the other adjacent sample comparator, logic sub-circuits in the PDC give indication to the system that the peak instance has occurred next to the center sample.

Pj is sampled asynchronously with SYSCLK having a sampling period Tclk more than about ⅕ and less than about ⅓ a nominal minimum pulse period Tpsmin. Tclk is provided in the system 100 at such a rate that the each pulse is consecutively sampled above a threshold value.

In a particular embodiment of the invention disclosed in Ser. No. 09/132,962, the pulse waveforms amplitudes are sampled at about 50 MHZ. The pulse amplitudes are sampled with a high-speed A to D Converter (ADC). The sampled amplitude values and identifying sample clock ticks are processed by subsystems of the invention to determine the accurate time estimates of the instance of a data pulse peak relative to the timing of a system logic bit frame. Further processing of sampled data pulse amplitudes and identifying sample clock ticks by embodiments of this invention provide accurate estimates of the instances of the pulse peaks and estimates of the pulse peak amplitudes. These estimates are provided for use by the detection and control electronics (DDCS) of the disk drive system to enable system performance enhancements, e.g. PES processing and the like.

In Ser. No. 09/132,962, following the detection of a first pulse of an STM in a servo sector, succeeding pulses are evaluated until the detector determines a servo timing mark STM is present. Typically, the first pulse of the STM is pre-qualified (by detecting a succession of logic bit frames containing zeros). Once an STM is detected, information known by the DDCS is available to determine where logic bit data in the servo sector is to be expected relative to the system logic bit frame. The system can then process following values of pulse peak instance and amplitude, e.g. process PES data pulses to follow the data track's eccentric movement.

Each time a pulse peak instance and amplitude estimate is provided by the pulse detection channel of the Ser. No. 09/132,962 disclosure, it is stored by the system. When other predetermined conditions are met, the system processes the stored pulse data estimates to take corrective action.

In Ser. No. 09/132,962, the method and system works well as long as the sampling rate SYSCLK is high enough relative to the pulse width, PW, and the DPS1 analog pulse waveform being sampled and the PW is wide enough. If the values of at least the three center samples of a five sample group (e.g., X1, X2, X3, X4, X5) remain close to a quadratic approximation, the quadratic interpolation gives satisfactory estimates of the peak amplitude and peak instance. However, if the signal pulse width gets too small for the given sampling rate available, the error between the actual values of the outer two of the center three samples (e.g., X2 and X4) and the values predicted from the quadratic estimation polynomial gets too large and gives inaccurate values for the estimated peak amplitude and pulse peak instance. Inaccurate peak amplitude and instance estimates can cause post-processing electronics in the signal channel to place data bits in the wrong logic bit frame.

This is illustrated with regard to FIG. 4b in the present application, which shows a plot of two simulated bit signal waveforms: an ID bit signal 402 and an OD bit signal 404. The signals 402 and 404 are shown located within a system-logic-bit-frame indicated by arrows 410. The bit signals 402 and 404 are shown with wide (ID) and narrow (OD) pulse widths 406 and 408 respectively. The bit signals 402 and 402 are shown as positive going pulses, but may be considered equivalent to negative going pulses as well. The bit frame 410 is divided by five equally spaced sampling times 412 (−2, −1, 0, +1, +2) disposed symmetrically about center sample 414, i.e., from 0 phase at the center 414 of bit frame 410 to two samples 412 before (+1, +2) and after (−1, −2) center sample 414.

Signals 402 and 404 are shown with respective peak amplitudes 416 (ID) and 418 (OD) measured from base line 126 (i.e., peak-to-valley deflection) centered on the logic bit frame 410. peak amplitudes 416 (ID) and 418 (OD) correspond to the peak amplitude Apj of Ser. No. 09/132,962. The peak amplitudes 416 and 418 in FIG. 4b occur in phase with the center sample 414. Signals 402 and 404 are shown having similar peak amplitudes 416 and 418, but differing pulse widths 406 and 408, before processing by the peak detector 120 of the present invention. The peak amplitudes 416 and 416 are shown normalized to a value of 1 measured from a normalized base level of zero.

With respect to FIG. 4c in the present application, there is shown is a plot of sample amplitudes, ID1 422, ID2 424, OD1 426, and OD2 428 of signals 402 and 404 after processing by sampling and quantizing according to the peak detector channel, PDC, of Ser. No. 09/132,962. Processed signals ID1 422, ID2 424, OD1 426, and OD2 428 are the results of digitizing and processing as single samples, the bit signals 402 and 404 of FIG. 4b at the sample times 412 according to the method of Ser. No. 09/132,962. The results are shown under two cases of different relative phase of the peak amplitudes 416 and 418 with respect to the center sample 414. In the first case, ID1 422 and OD1 426 show peak amplitude estimates Ap(ID)1 417 and Ap(OD)1 419 when the peak amplitudes 416 and 418 are coincident with the center sample 414. In the second case, peak amplitude estimates Ap(ID)2 421 and Ap(OD)2 423 are shown when the peak amplitudes 416 and 418 are not coincident with the center sample 414 but instead are out of phase with the center sample 414 by ¼ of time between adjacent samples 412. Peak amplitude estimates of FIG. 4c correspond to the estimated peak amplitude Ep'j of Ser. No. 09/132,962.

In the first case (bit signal peak in phase with center sample), the peak estimates of ID and OD bit signals Ap(ID)1 417 and Ap(OD)1 419 give acceptable results. They have the same value, about 0.98, of the normalized peak amplitude of the bit signals 402 and 404.

However, in the second case (bit signal peak out of phase with center sample by ¼ sampling time) the peak amplitude estimates Ap(ID)2 421 and Ap(OD)2 423 of the ID signal 402 and the OD bit signal 404 are different from the in phase estimate, and also greatly different from each other. The out-of-phase peak estimates Ap(ID)2 421 and Ap(OD)2 423 have relative values of 0.87 and 0.60.

The accuracy of the out-of-phase peak estimate Ap(ID)2 421 for the ID signal 402 is acceptable. The accuracy of out-of-phase peak estimate Ap(OD)2 423 is not.

One solution is to use a device for sampling that has a higher sampling rate to achieve the desired accuracy with the narrower OD pulses. Unfortunately, higher speed sampling devices usually come at an exorbitant premium in cost and perhaps are not even available at the sampling rates needed. The challenge is to try to process the signals in a way to improve the peak estimation accuracy with sampling devices of a given sampling rate.

The problem of sampling the pulses then becomes limited by the sampling rate available. As the OD pulse gets narrower, the sampling period (from the Nyquist sampling theorem) must also decrease. For a 5 sample per pulse, this places a limit on the minimum pulse width for a given sampling rate. Consequently, the performance of the sampling device (e.g., an A/D converter) limits the system performance. Therefore, in a real system, the accuracy of the estimation may be 1% at the ID but only 30% at the OD. This is a sampling theorem problem, in that it may not be possible, or economically feasible to obtain a fast enough sampling rate.

This problem will always be a concern in disk drive performance. As converters get faster, disk speed will be increased correspondingly and the same limitation of OD vs ID pulse width difference will exist.

The statement of the problem then becomes fairly simple: we want to be able to reproduce both the ID and the OD pulse signal with the required accuracy at the minimum sampling rate possible. In a case which requires 5 samples for estimating pulse amplitude and instance we may be limited to how wide the ID pulses can be made at the inner diameter. This occurs because their circumferential spacing from each other is limited by inter-symbol interference, i.e, energy from the tail of a pulse contributing to and distorting the waveform of the adjacent pulse.

A particular ratio of pulse width between ID and OD will establish the required sampling rate.

Attempts have been made to try to put the pulses through a linear analog filter, also known as an Infinite Impulse Response (IIR) filter, to broaden the narrow pulses. This causes too much interference from pulse to pulse, because energy from the previous pulse spills over into the following pulse, e.g., slowly decaying tails from the previous filtered pulse output. This is particularly problematic, when the tails of preceding data pulses of high amplitude are filtered and broadened, and interfere with following servo burst pulses.

Another concern with using analog circuit solutions is that they take up too much board area and require too many expensive components as disk drive form factors shrink. A solution minimizing parts count and board area is sought. We would like to filter the pulse in a way that stretches the pulse width without adding an infinite impulse response.

In contrast to pulses from the PES marks which may have small or no amplitude depending on the alignment of the read head with the data pits the STM signals have fairly large peak amplitudes as are all data peaks when the head is aligned. A clip level or detection threshold is typically defined by the system for detecting the presence or absence of a pulse, after the amplitude of the pulse peak is determined. The system compares the amplitude of the pulse to the threshold during the system logic bit frame. A logic one is output to the receiving system electronics if the peak amplitude exceeds the threshold, otherwise a logic zero is output for that logic bit frame. The threshold is preferably placed halfway between the top (base line level for a negative going pulse) and bottom (expected peak amplitude) of the pulses. The threshold is preferably adjusted or reset depending on the variation of the peak amplitude of the pulses. The system needs accommodation to the fact that there is varying amplitude of the pulse signal peaks.

In Ser. No. 09/132,962, an analog VGA circuit was used to normalize the pulse amplitudes by means of feedback circuitry from the peak detector PDC to the VGA. Analog VGA circuits tend to take up relatively large area and can be relatively expensive. In the case of analog signal processing, analysis shows that area detection of a differentiated OD signal (e.g., differentiation of the pulse followed by sampling and then an integration step to recover pulse shape without offset) requires at least 20 samples per servo bit period. It also shows that quadratic interpolation from three single adjacent samples will acceptably digitize the amplitude of undifferentiated, narrow OD signal with 10 samples per servo period. A requirement of 10 samples per bit period places undesirable constraints on the sampling rate required with narrow pulses.

Therefore, it would be an advantage to provide a disc drive system which provides a pulse data channel that:

. . . achieves a desired pulse instance and peak amplitude estimate accuracy at a given sample frequency rate, . . . can reduce cost, circuit board area and/or improve accuracy, . . . is relatively insensitive to pulse width variation from ID to OD, . . . replaces costly and area intensive analog circuitry with relatively low cost, digital integrated circuits, . . . reduces area demands for future miniaturization of disk drive electronics, . . . compensates for varying pulse base line levels (pulse offset) with component aging and disc reflectivity, . . . compensates for varying pulse peak amplitudes with component aging and disc reflectivity.

SUMMARY

A disk drive system in accordance with the present invention includes an output providing an analog signal including a sequence of analog signal data pulses recovered from stored data on a storage disk. The data pulses have pulse widths greater than about width PW, peak magnitudes about Ap(j) deviating from a respective base line and respective peak instances. The base lines, are displaced by base line offset value $\beta$ from a zero reference level.

The disk drive system includes a digital peak detection channel of the present invention in which an analog input of an analog to digital sampling device receives continuous analog values of the sequence of signal data pulses. The sampling device is responsive to a sampling clock by sampling values y(k) of the analog signals at each one of successive sample. clock times - - - , (k−2), (k−1), k, (k+1), (k+2), the device converts each analog value y(k) to a corresponding digital value - - - , Y(k−2) Y(k−1), Y(k), Y(k+1), Y(k+2), - - - . The sample clock has a sampling period of about ⅕ the pulse width expected.

The sampling device outputs sampled digital values - - - , Y(k−2) Y(k−1), Y(k), Y(k+1), Y(k−2), - - - , to a digital sample value averaging device. The sample value averaging device provides an output of successive digital sample average values X(k−1), X(k), X(k+1), - - - in which each digital sample average value X(k) is formed from a sequence of 2 adjacent samples, k, k−1, and is equal to [Y(k)+Y(k−1)]/2.

A peak pulse instance recognition device receives the output of 3 successive sample average values X(k), X(k−1), X(k−2) and provides a digital peak detect output (Pkdet) with a logic signal level at a true logic value when the logic value ((X(k−1)>X(k) AND (X(k−1)>X(k−2))) is true. This provides to the disk drive control system an indication that a signal pulse peak, Ap(j)($k_{pk}$) occurred within plus or minus the one sampling period of the sampling time t(kpk). From this instance, t(kpk), other circuitry may derive status changes and computations to direct the,system response, (e.g., head position, threshold level setting, and the like) as is known in the art.

The data channel in the disk drive system of the present invention uses three successive average values X(k−2), X(k−1), X(k) are output to corresponding registers REG1, REG2, REG3 that provide corresponding outputs X1, X2, X3 sent to a dual paired input comparator connected to said registers. The comparator provides a peak detect output true logic level when the logic value ((X2>X1) AND (X2>X3)) is true. The peak detect output indicates to the disk drive system that a peak amplitude of a signal pulse has occurred between the sample instance k minus one sampling period and the sample instance k plus one period.

A data pulse peak magnitude estimator computes an estimate Ep(j), of the pulse peak amplitude Ap(j) of a pulse, j, when the peak is detected by a true logic value on the peak detect output.

The peak magnitude detector first calculates a first estimate of the peak pulse value by computing and outputting the result of an estimation algorithm, X2+|X1−X3|/8. The value X2 is the center value of three adjacent averaged sample values X1, X2, X3 from the digital sample value averaging device. The result of the algorithm is output as the peak estimate Ep(j) through a connection to the disk drive system.

Base line offset for non-PES signal data pulses is removed by a base line offset removal filter which subtracts the offset β from the first peak estimate value. A preferred embodiment of a digital FIR base line offset removal filter is shown that has an FIR filter function Ep'j(k)−½[Ep'j(k−2)+Ep'j(k+2))]. ½ of the common offset values β in each of the estimates Ep'j(k−2) and Ep'j(k+2) are subtracted from the value of Ep'j(k) to cancel the offset β in the center estimate Ep'j(k).

A general logic gate assembly, e.g., an FPGA or DSP receives the output of the peak magnitude estimator and peak instance detector. The functions of the logic gate assembly include compensation functions. These compensation functions compensate for amplitude variation of peak pulse amplitude between ID and OD, and variation of base line offset of the PES pulses and the STM pulses from the servo sectors. Such compensation functions are known and may be implemented by a person having skill in the art of digital design, and are not part of the present invention.

The disk drive system of the present invention includes a plurality of circumferentially spaced apart servo sectors having specific characteristics. The specific characteristics include: at least a multi-bit STM pattern in every servo sector. at least one each A, B, C and D PES pattern in every servo sector; at least one sector locator pattern in every servo sector; and at least one track locator pattern in every servo sector. One embodiment of a simple servo sector architecture is shown for the present invention. The particular type and arrangement of bits in the patterns may be selected for a particular disk system architecture by one having skill in the art of digital system design.

The present invention discloses the computing means for computing (A−B)/(C−D), for providing corrected estimated peak pulse signal values A, B, C, D, and for compensating for a varying alpha scale factor multiplying analog pulse signal values and a varying β offset factor as a generic logic assembly e.g., FPGA. configured by one having skill in the art. Such computing means may also be constructed from other computing devices such as a plurality of individual logic gates, a microprocessor running a stored programs, or a micro-coded processor as is known in the art.

The disk drive system of the present invention also includes a pulse signal threshold setting device for setting the threshold of recognizing the 1/0 threshold of the signal pulses. The pulse signal threshold setting device for the present invention is shown as a block diagram implementing the threshold adjustment function. The design of such a device is within the capability of an ordinary skilled practitioner of digital design and is not part of the present invention. The pulse signal threshold setting device has an input for receiving estimated peak STM pulse values from a sequence of sectors. The threshold setting device implements a threshold algorithm using STM estimated peak pulse values. The threshold algorithm provides a pulse signal threshold value for recognizing the presence of a logic bit in a servo logic bit position from the value of the threshold and the estimated peak value if a peak is detected at that bit position.

In the present invention, an embodiment is shown is which the threshold algorithm is ½ of the average value of the estimated peak STM pulse values received from a sequence of servo sectors.

A particular embodiment includes the following elements:
1) A 10 bit 50 MHz ADC. Only 7 of the 10 bits are needed to do the peak amplitude calculation. A VGA is not needed to allow for peak pulse amplitude variation. The offset and amplitude variations are accommodated digitally by the wider ADC dynamic range and the compensation functions implemented in and processed by the FPGA front-end electronics other than the read/write head preceding the A-to-D consist of only a preamplifier.

Each digitized sample value is averaged with the previous sample value before supplying it to the peak detection and peak amplitude circuitry of the present invention. This effectively stretches the pulse width of the (narrow) OD servo bit signals. Peak Amplitude and Peak Detect outputs the present invention are processed separately to give the desired Gray code and PES calculations. The Gray code is passed thorough a (−0.5, 0, 1, 0, −0.5) filter to remove any base level offset. FIG. 5 is a simplified block diagram of an embodiment of the APDC of the present invention. FIG. 3 shows a simple STM, PES and Gray code servo sector pattern for the purposes of illustration.

2) A finite impulse response (FIR) filter is used to stretch the pulse width of the sampled signals. It causes the width of a narrow pulse to stretch more than a wide pulse. A first and preferred method is to add successive samples: e.g., a sampler with one bit of delay followed by an adder connected to the sampler output and the delayed sample output. A FIR filter is preferred over an analog (linear) adder. In a linear system with exponential sine and cosine eigenvalues, e.g., an Infinite Impulse Response (IIR) filter, the output response of the linear system to an input impulse contains non-zero values extending to infinity: (the Laplace transform of the system has components extending to infinity). In a finite impulse response filter (FIR) after some time, the amplitude of the output goes to zero. Therefore, the effect of adjacent pulses overlapping into following pulses can be minimized.

The present invention uses two registers and a two-input adder to emulate an FIR filter to take an average of successive pairs of samples i.e., X(i)=(Y(i)+Y(i−1)/2 and then uses the X(i)-values in the peak instant and amplitude estimation method. That averaging transforms a narrow pulse to an estimated pulse with broader pulse width without changing the estimate of peak instance, although it does change the estimated peak amplitude.

3) The apparent problem of changing the amplitude is accommodated by a pulse amplitude normalization process that uses amplitude data from reference marks on the disc. In previous systems, OD and ID pulse widths were different, but the peak amplitude was the same. With the FIR filter averaging of this invention, the amplitude of the OD averaged pulse is lower than the averaged ID pulse [since the values average with a pulse that's already wide are closer together than those for a pulse whose adjacent values are quite different, i.e., a narrow pulse relative to the sampling period. The invention doesn't change pulse width of the ID pulses much, but significantly expands the width of the narrower OD pulses.

The key is the extra bits of resolution available from the A-to-D converter used in converting the sampled analog pulse waveforms into digital sample values. To achieve a 1% accuracy target, only 6 or 7 bits are needed to get the desired accuracy. Having more sampling bits available is an advantage because no information is lost due to the sampling; when the peak amplitude decreases.

The actual determination of the threshold value. the PES computation and the Gray code detection and decoding may be done in a companion DSP in cooperation with peak amplitude estimates and peak instance estimates provided by the digital peak detector of the present invention. Seven gate signals (STM, A, B, C, D, S and T) tell the DSP when the PES sample AMPLITUDE or GRAY CODE AMPLITUDE values can be read. The DSP uses the STM Gray code amplitude to determine the threshold using some fraction of a low pass filtered amplitude from previous servo sectors. The DSP uses the PES amplitude estimates corresponding to the gates A, B, C, and D to calculate (A-B)/C-D). The DSP uses the Gray code amplitude estimates corresponding to S and T to decode the digital values. A logical one is recognized to have occurred by the system if the S or T peak pulse amplitude is greater than a calculated threshold value.

The present invention includes reduced circuitry cost and size for pulse amplitude normalization, pulse width normalization, pulse offset elimination.

Furthermore, the present invention includes an undifferentiated OD signal pulse can be satisfactorily digitized with only 5 samples per servo bit period if two adjacent samples of the signal pulse are averaged prior to computing the peak amplitude estimate. The averaged signal amplitude ratio will change between wide ID pulses to narrow OD pulses in the ratio of between about 3:2 to 2:1 because of this averaging.

Also, the present invention includes an improved accuracy of pulse peak amplitude estimation and peak instance estimation is achieved by trading off an increased number of digitizing bits at a given sample rate for a pulse signal sampling A-to-D converter.

Also, in the present invention offset from a zero reference level in the amplitudes of recovered pulse signals is canceled by computing the ratio of a first difference of peak pulse amplitude between a first and second set of radially spaced peak marks and a second difference of peak pulse amplitude pulse between a third and fourth set of radially spaced peak marks amplitude (A-B)/(C-D). A, B, C, D are the peak amplitude estimates from the averaged peak pulse amplitude values received from staggered PES patterns A, B, C, D defined in a servo sector. Scale factor or peak pulse amplitude variation from ID to OD pulses is canceled in the PES signal by computing (A-B)/(C-D). The same amplitude scale factor alpha multiplies A, B, C, and D amplitudes and hence is canceled when (A-B)/(C-D) are calculated. Computation of (A-B)/(C-D) is done digitally in a preferred embodiment at low cost by using otherwise unused gates in an inexpensive FPGA or DSP integrated circuit. Any offset (base line level) in the Gray code digital information (i.e. track or sector ID) of sampled pulses from data track and servo sector address patterns is canceled by digitally subtracting from a first estimate value of the detected pulse peak amplitude the average of the estimate values of one sample preceding the detected peak and a second sample following the detected pulse.

One embodiment of a simple digital base level offset removal filter is disclosed for averaging a sample two samples before with a sample two samples after the sampling of the detected peak. This is a digital FIR filter having filter coefficients (−0.5, 0, 1, 0, −0.5).

The detection threshold for the Gray code digital information can be controlled by using as a threshold reference half of the low pass filtered amplitude of the servo sector SYNC marks (STM). The SYNC marks are always present at the beginning of every servo sector. Again, the low pass filtering may be done digitally at a low cost using otherwise unused gates in an inexpensive FPGA or DSP integrated circuit.

BRIEF DESCRIPTION OF THE DRAWINGS

For a further understanding of the present invention, reference should be had to the following detailed description, taken in conjunction with the accompanying drawings, in which like parts are given like reference numerals and wherein;

FIG. 3 depicts a detailed view of the servo sector in FIG. 2.

DETAILED DESCRIPTION OF THE INVENTION

Figure 1:
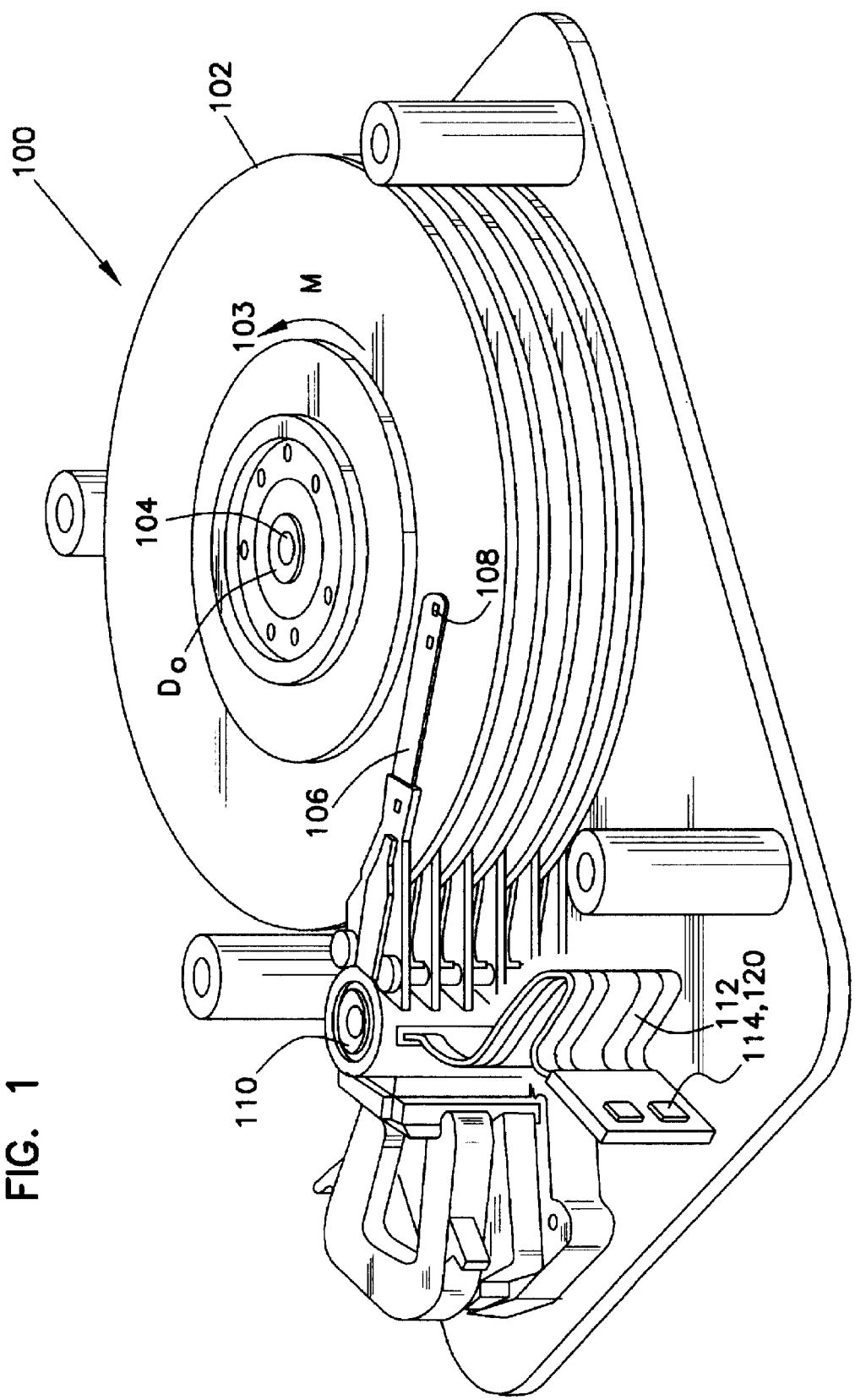
FIG. 1 illustrates a disk drive system incorporating an embodiment of the present invention.
Figure 2:
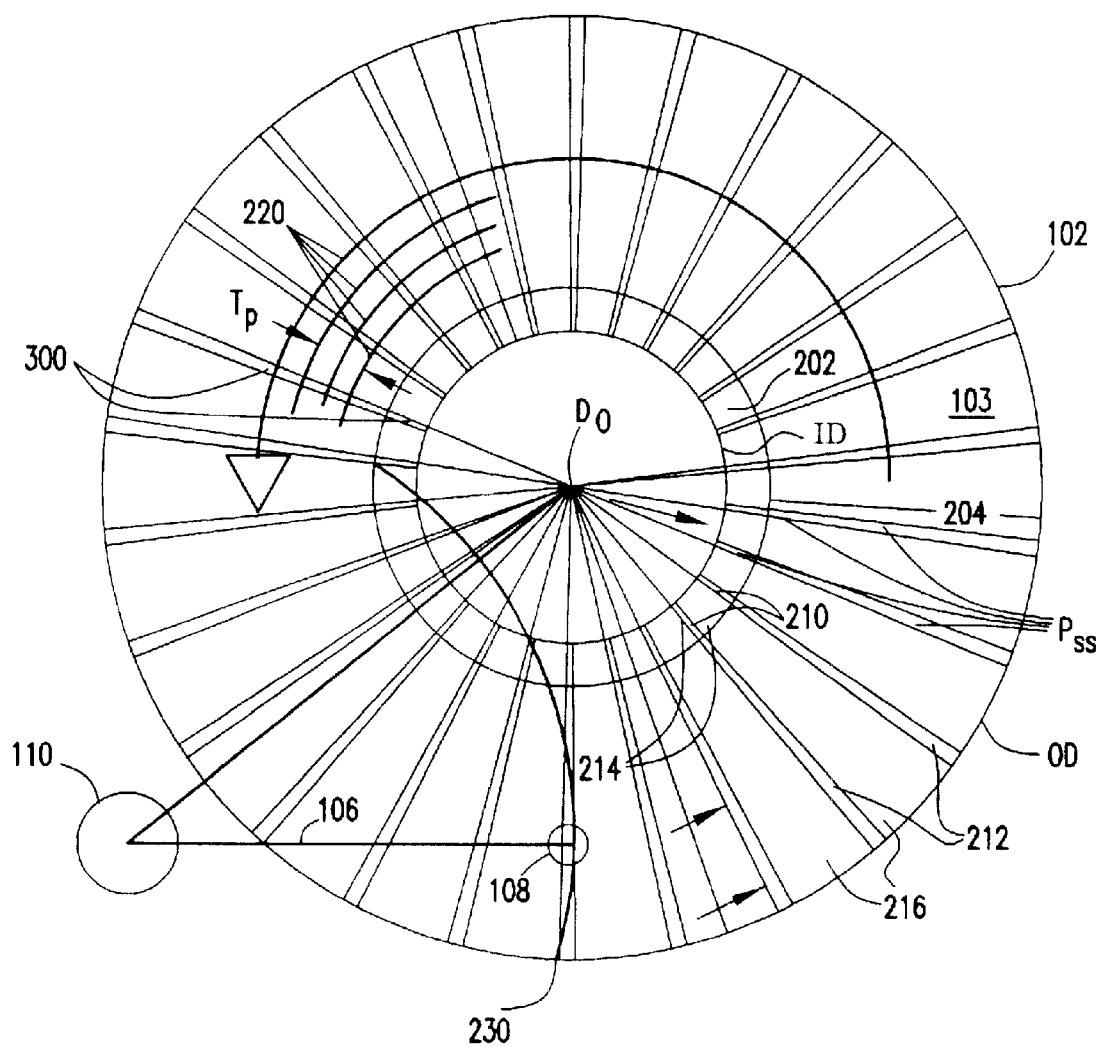
FIG. 2 is a plan schematic view of a servo sector, data sector disk architecture used in the system of FIG. 1.

Referring to FIG. 1, there is shown an example of an optical disk drive system 100. A plurality of optical disks 102 (with upper and lower disk surfaces 103) having respective center holes Do are mounted on a drive spindle 104 therethrough. The disks 102 rotate counter clockwise (indicated by the arrow M) with rotating speed r p m. An actuator arm 106 has a distal end that carries flying read-write head 108 above the surface 103 of disk 102. Rotary actuator assembly 110 is connected to a proximal end of actuator arm 106. Rotary actuator assembly 110 supports and positions actuator arm 106 and head 108 across the surface of disks 102 by rotary motion thereabout.

Figure 5:
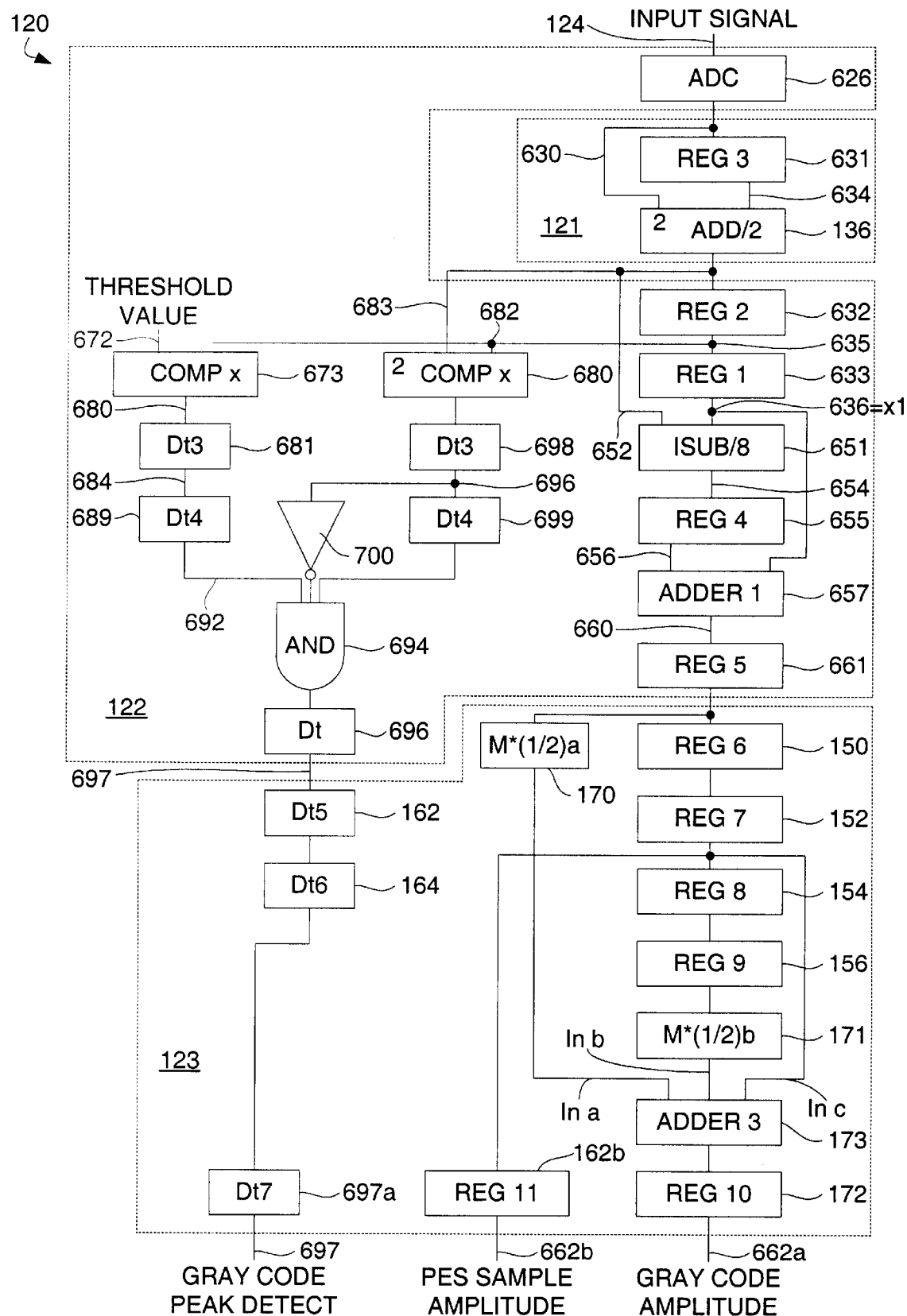
FIG. 5 is a schematic block diagram of an embodiment of the averaging digital peak detection channel APDC 120 in accordance with the present invention included in the system of FIG. 1.
Figure 6A:
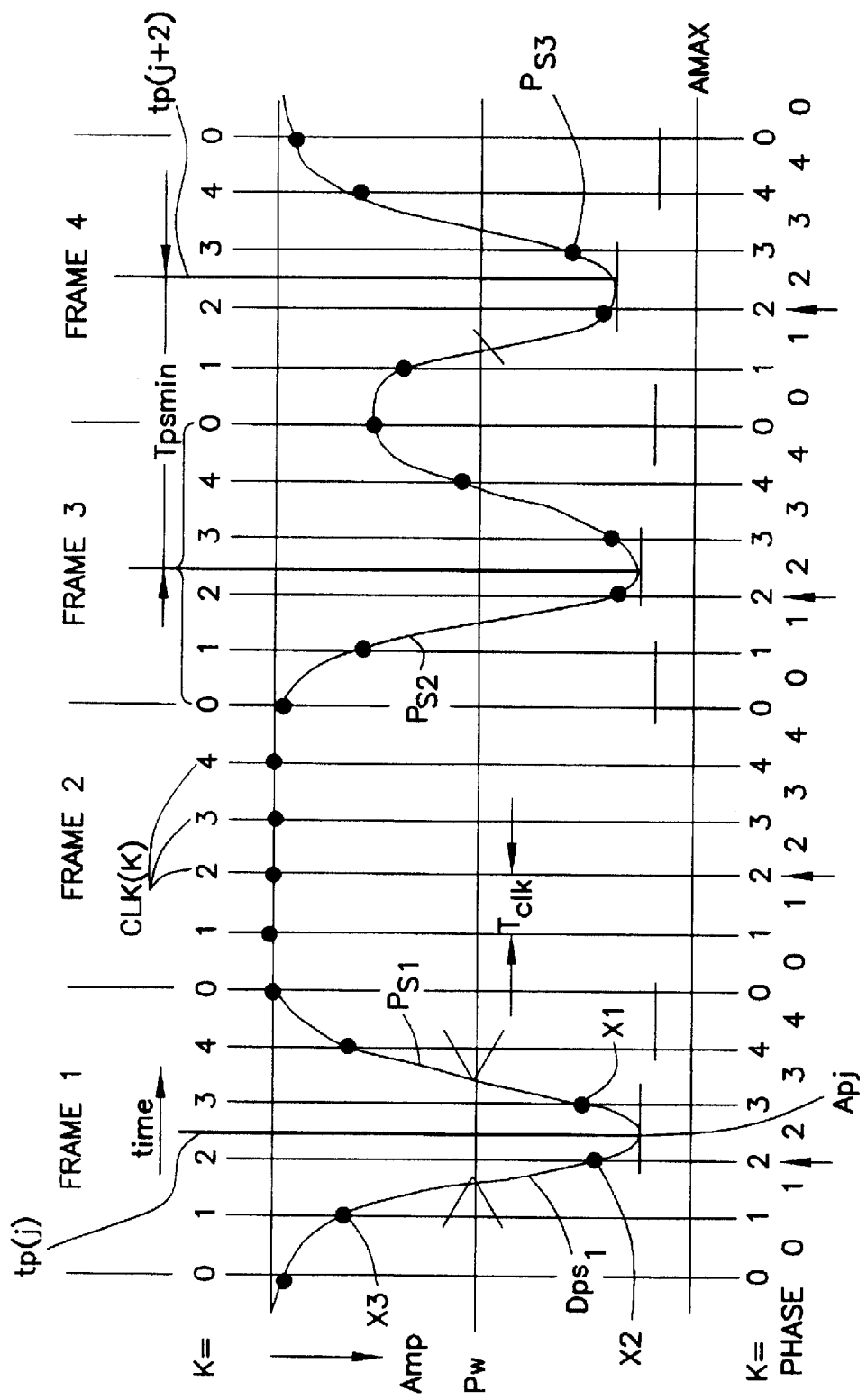
FIGS. 6a–b is a depiction of recovered pulse waveforms.
Figure 6B:
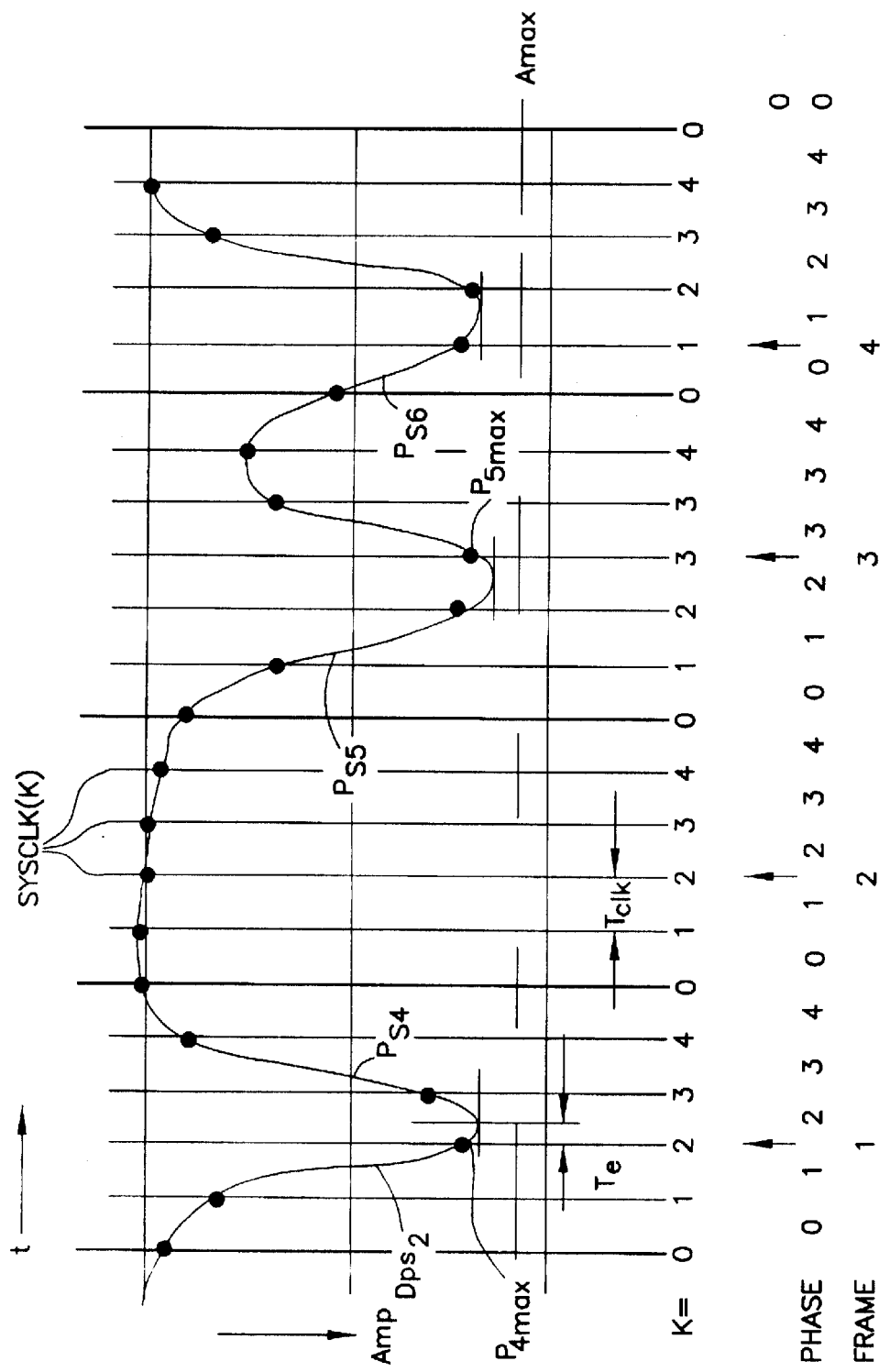

System 100 of FIG. 1 shows signal processing electronics 114 located at some remote distance from the head 108. Referring to FIG. 5 there is included in the signal processing electronics 114 a plurality of new Averaging Pulse Detection Channels (APDC) 120 of the present invention (one shown here) having an input 124 to receive signals DPS(j) from the corresponding read head(s) 108. Alternatively, signal processing electronics 114 including the pulse detecting channel 120 may be located on the head 108 itself with additional signal processing circuitry (not shown) located remotely.

For the purposes of this discussion it is assumed that reference to the actuator arm 106, read/write head 108, and disk surface 103 is understood to apply to each of the plurality of disks 102 of the drive system 100. Analog data pulse signals DPS(j), retrieved from each respective disk surface 103 arc received by corresponding signal receiving devices in the head 108. The signals DPS(j) from head 108 are transferred along arm 106, through cable assembly 112 to respective signal detection electronics 114.

Referring to FIG. 5, the structure and operation of a new pulse detection channel APDC 120 will be contrasted with that of the pulse detection channel (PDC) of Ser. No. 09/132.962. The detection channel 120 is modified from the PDC of Ser. No. 09/132,962 in several ways. First, the VGA 620 is eliminated.

Referring FIG. 4a to FIGS. 6a–b, the data pulses DPS(j) have respective pulse widths 460, 462 at the ID and OD greater than about width PW and peak magnitudes 464, 466 about Ap(j) deviating from a respective base line 470. Each pulse DPSj has a respective peak instance occurring at tp(j). The base line 470 is displaced by base line offset β from a zero reference level 474. The pulses DPS(j) are received in the electronics 114 at the input 124 and processed by the APDC 120 in combination with additional circuitry described below to detect the time of occurrence tp(j) and the magnitudes 464, 466 of the pulse peaks Ap(j).

The APDC 120 has many of the same functional elements as the prior PDC, with some new elements added and one functional element deleted. In FIG. 5 of the new APDC 120, clocking connections to the sampling clock SYSCLK have been omitted for simplicity, but will be understood to clock in the same way as the circuit elements of the prior PDC. That is, delay bits and registers have a one clock bit delay between the input and the output, and the sampling ADC 626 samples the value of the analog signal at its input and presents the digital equivalent at its output with a short time delay much less than the period of the sampling clock SYSCLK. It should also be understood that the time delay through the logic elements, e.g., comparator, adder, subtractor, divider, AND gate and inverter is also much less than the sampling clock period.

Comparing FIG. 5 of the present invention to Ser. No. 09/132,962, it is seen that the VGA 620 in the PDC has been removed from the circuit of APDC 120 entirely. VGA 620 provided a signal level normalization function in the peak detect circuit of the prior disclosure. In the present invention, signal level normalization is done by digital means instead of analog means in the prior PDC as explained further below.

Also note particularly, that the peak amplitude estimates for gray code pulses 662a and PES pulses 662b are routed to separate outputs 662a and 662b instead of a common output 662 in the prior PDC. The explanation of the separate outputs 662a and 662b is given further below.

Elements retained from the Ser. No. 09/132,962 peak detector PDC form a first estimating function in combination with the FIR filter 121. The elements retained from the prior PDC remain as before, with two changes to input connections discussed below. The elements retained are registers REG2 632, REG1 633, REG4 655. subtractor/divider |SUB|/8 651, REG2 661; ADDER1 657; delay bits DT1 681, DT2 689, DT3 698, DT4 699, comparators COMPx 690, Compt 673, the three input AND gate 3AND 694; The elements retained have their respective inputs and outputs connected as described in Ser. No. 09/132,962 before, except as described below.

A new element is added between the output 634 of REG3 631 and the REG2 632 input. The new element is a-two input ADDER/DIVIDER 136, having inputs INPUT1 and INPUT2 and output 140. The input of |SUB|/8 651 is still connected with the input of REG2 632. Where these were previously connected to output 634 of REG3 631 they are now connected to ADC output 140. Also, INPUT2 of COMPx 690 previously connected to output 634 of REG3 631 now connects to ADDER/DIVIDER 136 output 140. The remaining elements are otherwise connected as in the prior PDC.

In addition to the new functional element register 631 and ADDER/DIVIDER 136 that comprise FIR filter section 121, additional elements are added to the prior PDC to support desired characteristics of pulse offset elimination and scale factor adjustment for PES and gray code pulses. These additional elements include registers REG6 150, REG7 152, REG8 154, REG9 156, REG10 172, REG11 162b; three Delay bits Dt5 162, Dt6 164, and Dt7 697 are added, along with two divide_by_2 amplitude dividers M*½A 170, M*½B 172, and a 3_input ADDER3 173 having inputs INa, INb, INc.

Connections internal to the remaining elements in the new APDC 120 have also been changed from the Ser. No. 09/132,962 PDC. In APDC 120 the sample output of ADC 626 is connected to register 631 input in place of the connection to the input of omitted register 631. The sample output of ADC 626 is also now connected to the one input of the ADDER/DIVIDER 136. The other input of ADDER/DIVIDER 136 now connects to register 631 output.

Connections to the new ADDER/DIVIDER 136 output 140 replace two of the prior connections. ADDER/DIVIDER 136 output 140 connects to inputs of two of the remaining elements in place of the prior connections. ADDER/DIVIDER 136 output 140 connects to one input 683 of comparator 690 in place of the prior connection to the output of the omitted register 631. The input 652 of subtractor/divider 651 connects to output 140 in place of the prior connection to output 634 of the omitted register 631.

These new connections alter the behavior of the APDC 120 from the previous PDC in the following way: At every sampling instant (i) 138 in the APDC 120, the delay register 631 presents to one input of the ADDER/DIVIDER 136, a previous sample value Y(i−1) of the data pulse DPS(j). Since the other input of the (10 bit) Averaging ADDER/DIVIDER 136 connects directly to the output 630 of the ADC 626 (in this case a 10 bit flash converter), the averaging ADDER/DIVIDER 136 provides the a 10-bit digital average of Y(i) and Y(i−1), i.e. [Y(i)+Y(i−1)]/2 at its output.

Comparing the operation of the APDC 120 with that of the Ser. No. 09/132,962 PDC, it can be seen the computation of an estimate Ep(j) of the peak value Ap(j) uses the same circuit elements operating in the same way, except that, instead of evaluating the estimate Ep(j) based on one sample (Y(i)) of DPSj at each sample time (i), the estimate Ep(j) is based on the average of two samples X(i)=[Y(i)+Y(i−1)]/2.

This averaging provides increased sample pulse width to improve the accuracy of estimation for peak amplitude for the narrow pulses at the OD of the disk surface.

In the Ser. No. 09/132,962 PDC pulse signal level normalization was done to compensate for variation of Psj pulse amplitudes due to the various causes described above. The VGA 620 provided a gain controlled analog output 624 to digitizing input 622 of flash analog-to-digital converter 626. The APDC 120 embodiment of the present invention eliminates the analog VGA for compensating pulse amplitude variation by providing the alternative of a compact, low cost, area efficient digital compensation method described here below.

Prior to the amplitude variation compensation, a first estimate Ep'(j) of the peak amplitude is first computed by a first estimation section 122.

The FIR filter 121 replaces the register 631 in the Ser. No. 09/132,962 PDC. FIR filter 121 is comprised of prior register REG3 631 having its input connected to output 630 of ADC 626 for receiving digital samples Y(i−1), Y(i), - - - therefrom, at each sampling clock instance, i, of SYSCLK (not shown) as before. At clock (i) of SYSCLK, (not shown) output 634 of REG3 631 presents the value Y(i−1) to an input INPUT1 of ADDER/DIVIDER 136 instead of the input of REG2 632. That is, the value of the ADC output 630 sampled at the previous clock (i−1). The ADDER/DIVIDER 136 has its other input INPUT2 connected to ADDER output 140. INPUT2 receives the value Y(i) at clock (i). At sampling clock instance (i) the ADDER/DIVIDER 136 sums the two samples Y(i), Y(i−1) (i.e., the current sample from ADC 626 and delayed sample from register 631) at its inputs input1 and input2, divides the sum Y(i)+Y(i−1) by 2 and presents an average X(i) of the two samples: X(i)=[Y(i)+Y(i−1)]/2 at output 140 of 136. FIR filter 121 thus provides the average of two successive samples of output 630 of the ADC 626 at every sampling clock instance (i).

Average sample values X(i) at the output 140 of ADDER/DIVIDER 136 are presented to a first peak pulse amplitude estimation section 122. Section 122 is formed of remaining elements from the prior PDC. The remaining elements are registers REG1 633, REG2 632, REG4 655, REG2 661, REG4 655, REG5 661; subtractor/divider 651; ADDER1 657; comparator COMPx 690; delay bits Dt1 681, Dt2 689, Dt3 698, Dt4 699, and Dt6 164; inverter 700; and 3 input AND 694. The following is the discussion of the operation of the these elements of the present APDC 120 in terms of the operation of the PDC in the Ser. No. 09/132,962 application except that the values of X(i) are the averaged values of Y(i) and Y(i−1), reference to clock ticks (k) are understood to be equivalent to sample times (i).

At clock tick k ADDER/DIVIDER 136 outputs the average value X(k) nearly instantaneously (relative to the clock period SYSCLK) and provides the digitized signal average X(k) at its output 140. The average value X(k) at output 140 is equivalent to the variable X3 in the prior PDC.

$X(k)=X3$ Equation 1

The ADDER output 140 provides the digital value X(k)=X3 to an input of a second register REG2 632 that is also clocked by SYSCLK. The register REG2 632 receives and stores the value X(k) at the SYSCLK tick k while holding REG2 632 output 635 at its previous value X(k−1). The value X(k−1) is equivalent to the value X2 of the Ser. No. 09/132,962 PDC.

$X(k-1)=X2$ Equation 2

Register REG1 633 receives and stores the value X(k−1) from REG2 632 output 635 at clock tick k and outputs its previously stored value X(k−2) to one input 650 of subtractor/divider 651. X(k−2) is equivalent to the value X1 of the Ser. No. 09/132,962 PDC.

$X(k-2)=X1$ Equation 3

The other input 652 of subtractor/divider 651 receives the value X(k) t(kpk) 140 of ADDER/DIVIDER 136. Subtractor/divider 651 porvides |X(k)−X(k−2)|/8 at its output 654 as an output value (|[SUB|/8](k)) at clock tick k. Thus at every clock cycle k, Subtractor/divider 651 forms the result |X(k)−X(k−2)|/8 (|[SUB|/8](k)) at its i output 654.

$[|SUB|/8](k)=|X(k)-X(k-2)|/8=|X1(k)-X3(k)|/8$ Equation 4

The subtractor/divider 651 can be implemented as a simple full ADDER with the addition of a 3-bit shift to provide the divide by 8 function. [|SUB|/8](k) is equivalent to the relation |X1(k)−X3(k)|8 in the Ser. No. 09/132,962 PDC and is the input to a fourth register Reg4 655.

At each clock tick k, REG4 655 stores the value [|SUB|/8](k) and presents the previous computation result [|SUB|/8](k−1) to one input 656 of a two input full ADDER1 657. ADDER1 657 receives the output 636 of REG1 633 (i.e., X1(k)) at its other input 658.

At each clock tick k ADDER1 657 adds the value at the REG1 output 636 (X1(k)) to the previous result [|SUB|/8](k−1) from the output 656 of REG4 and outputs the resulting summation ADDER1(k) at its output 660 to an input of register REG2 661.

$ADDER1(k)=(X1(k))+[|SUB|/8](k-1)$ Equation 5

However, X1(k) is also X2(k−1), so $ADDER1(k)=(X2(k-1))+[|SUB|/8](k-1)$ Equation 6

From Equation 4

$ADDER1(k)=X2(k-1)+|X1(k-1)-X3(k-1)|8$ Equation 7

From equations 1, 2, and 3

$ADDER1(k)=Ep'j=X(k-2)+|X(k-3))-X(k-1)|8$ Equation 8

This is the same equation as the peak amplitude estimate Ep(j) as in the Ser. No. 09/132,962 PDC. However, this estimate is different from the previous estimate in several ways. First, it is a more accurate estimate of amplitude because each X(k) the average of two samples Y(k) and Y(k−1). Second, it lowers the effect of noise because averaging samples reduces the noise contribution by the RMS addition. Third, the effective pulse width of the quadratic fitting the three consecutive averaged samples at (k−1, k−2, k−3)) is broadened more for narrow pulses (e.g., at the OD of the disk), improving the accuracy of the estimates of peak amplitude and peak instance.

The magnitude of the amplitude estimate at the ADDER1 output 660 is smaller for the same sample values Y(i), because the average of two samples of different magnitude will be smaller than the magnitude of the larger sample alone. However, this is not a disadvantage, since the method of embodiments of this invention includes an amplitude normalization step explained in detail below.

At the next clock tick k+1, REG2 661 outputs the estimate; Ep'j=ADDER1(k) at output 662 which is the previous value of its input at clock tick (k).

REG2 661 will thus hold a first estimate value Ep'(j), of a peak amplitude Apj of pulse Psj, two clock ticks after the following two conditions are true; first, the last average value X(k−3)) is received by the ADDER/DIVIDER 136, and second, there is a peak detected, i.e. at X(k−2)>X(k−3)) and X(k−2)≧X(k−1) corresponding to X2≧X3 and X2≧X1 from Eq. 1 above.

To summarize, section 122 includes all the elements of the Ser. No. 09/132,962 peak detection circuit; i.e., ADC 626, REG2 632, REG1 633, |SUB|/8 651, REG4 655, ADDER1 657, and REG2 661. The operation of these elements is the same as in the Ser. No. 09/132,962 circuit, except that, 1) values X(i) from the output 140 of ADDER/DIVIDER 136 are input to REG2 632 as the averages of two samples, Y(i−1) and Y(i); and 2) the subtractor/divider |SUB|/8 651 input and COMPx 690 INPUT2 are connected to the output 140 of ADDER/DIVIDER 136. In other words, the description of Ser. No. 09/132,962 for processing the samples X1, X2, and X3 is valid for the section 122 embodiment of the present invention with the understanding that the X1, X2, X3 are each the average of two adjacent pulse samples Y(i) and Y(i−1).

The operation of the section 122 in computing preliminary values for the peak pulse amplitude estimates Ep'j are derived from 3 consecutive average values (X(i−1), X(i), X(i+1)) of two consecutive digital samples Y(i−1) and Y(i) of the received pulse in the same manner as the PDC of Ser. No. 09/132,962 application determined the actual estimate Epj.

Referring again to FIG. 4b, there is shown a plot of two simulated bit signal waveforms: an ID bit signal 402 and an OD bit signal 404. The signals 402 and 404 are shown with wide (ID) and narrow (OD) pulse widths 406 and 408 respectively. The bit frame 410 is divided into five sampling times 412 ranging from center sample 414 at 0 to two samples 412 before (+1, +2) and after (−1, −2) center sample 414.

Signals 402 and 404 are shown with respective peak amplitudes 416 (ID) and 418 (OD) centered on the logic bit frame 410, that is, with peak amplitudes 416 and 418 at the center sample 414. Signals 402 and 404 are shown with the same peak amplitudes 416 and 418, but differing pulse widths 406 and 408, before processing by the peak detector 120 of the present invention. The peak amplitudes 416 and 416 are shown normalized to a value of 1.

Figure 4A:
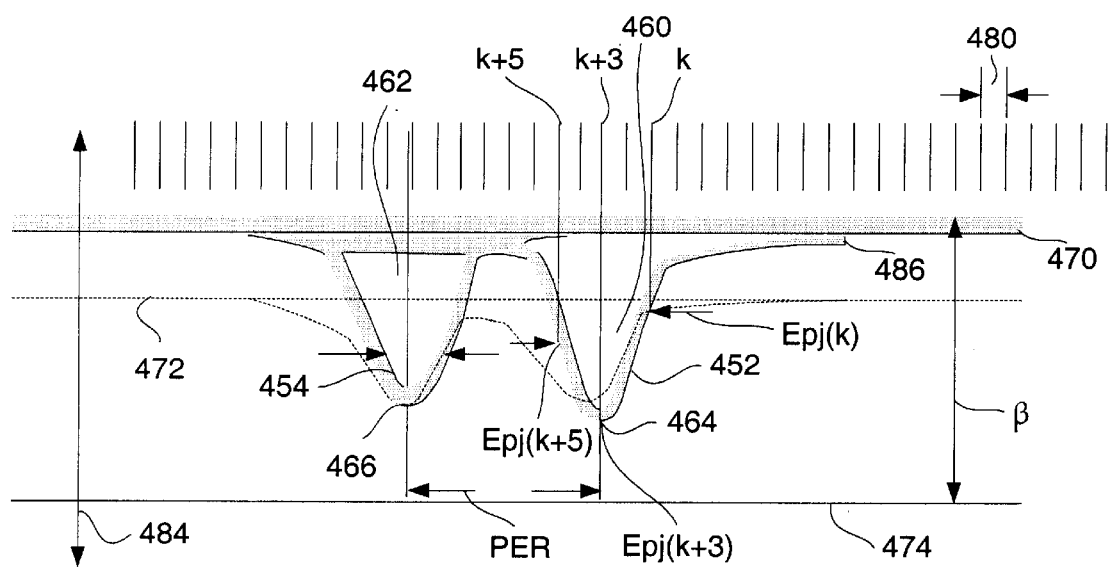
FIG. 4a is a plot of typical pulse signal wave forms from a disk such as that in FIG. 2 when operating in the system of FIG. 1.
Figure 4B:
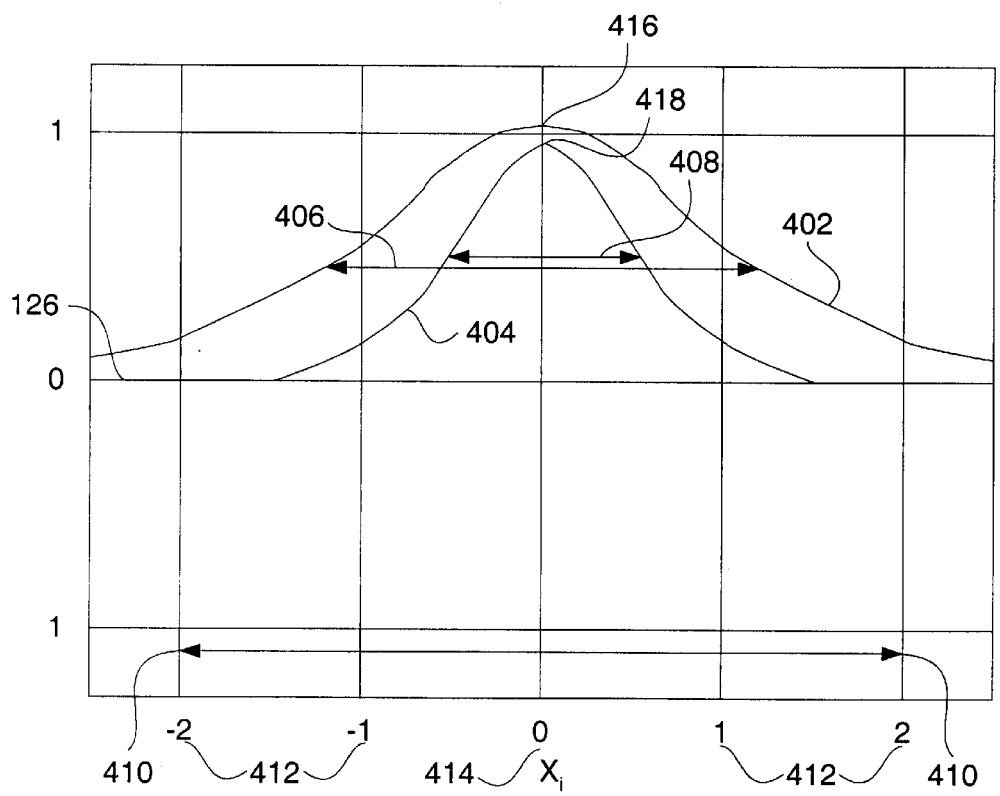
FIG. 4b is a plot of two typical ID and OD bit signal waveforms having different pulse widths shown centered within a logic bit frame in an embodiment of the present invention.
Figure 4C:
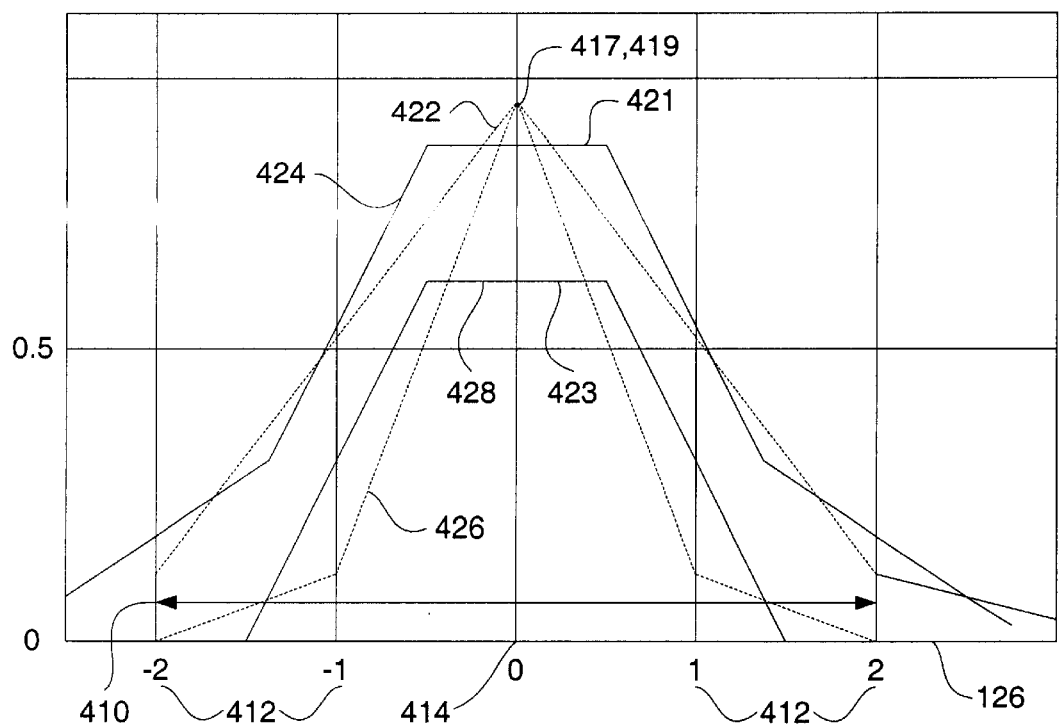
FIG. 4c is a plot of the ID and OD bit signals of FIG. 4b after digitizing and processing as single samples.
Figure 4D:
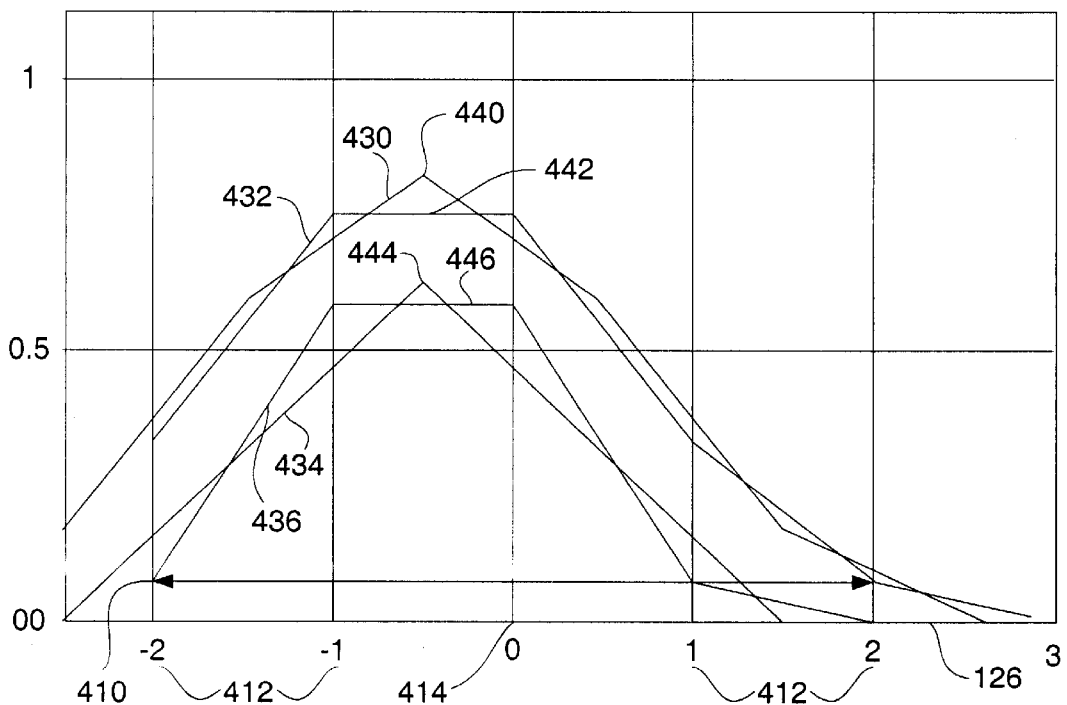
FIG. 4d is a plot of ID and OD bit signals shown in FIG. 4b after digitizing and processing as adjacent sample averages according to the method of the present invention.

With respect to FIG. 4d there is shown is a plot of pulse bit signals ID3 430, ID4 432, OD3 434, OD4 436 representing input signal waveforms 402 and 404 (e.g., Y(i)) processed by the APDC 120 in accordance with the present invention. Signals ID3 430, ID4 432, OD3 434, OD4 436, have estimated peak amplitudes Ap3(ID) 440, Ap4(ID) 442, Ap3(OD) 444, Ap4(OD) 446 respectively, corresponding to the first estimate Ep'j for peak pulse amplitude at output 662 provided by the APDC 120. Ap3(ID) 440 and Ap4(ID) 442 are the results of processing ID bit signal 402 from FIG. 4b in two different cases. The first case Ap3(ID) 440 is with the peak amplitude 416 of ID bit signal 402 sampled at the center sample 414. The second case, ID2 424, is with the peak amplitude 416 sample out of phase with center sample 414 by ½ the time between bit samples 412.

The processed signals ID3 430, ID4 432, OD3 434, OD4 436 are the results of digitizing and processing as averages of adjacent samples, the bit signals 402 and 404 of FIG. 4b at the adjacent sample times 412 according to the method of the First peak pulse amplitude Estimation Section 122 described above. The results are shown under two conditions of different relative phase of the peak amplitudes 416 and 418 with respect to the center sample 414. In the first case, ID3 430 and OD3 434 show results with the peak amplitudes 416 and 418 coincident with the center sample 414. In the second case, ID4 432 and OD4 436 show results with peak amplitudes 416 and 418 out of phase with the center sample 414 by ¼ of time between samples 412.

For the ID signal 402, the accuracy of the maximum value Ap(ID)3 440 of ID3 430 (that is the estimate of the peak amplitude for the ID signal 402 with zero phase difference between the peak and the sample time 414) relative to the peak amplitude 416 of FIG. 4b is about 0.875. The accuracy of the maximum value Ap(ID)4 442 of signal ID4 432 is (that is, the estimate of the peak amplitude 416 for the ID signal 402 with a phase difference between the peak and the center sample time 414 of ¼ sample time 412) is about 0.81 with respect to the normalized peak of 1.0 from FIG. 4b).

For the OD signal 404, the accuracy of the maximum value Ap(OD)3 444 of signal OD3 434 (that is the estimate of the peak amplitude 418 for the OD signal 404 with zero phase difference between the peak 418 and the sample time 414) relative to FIG. 4b is about 0.60. On the other hand the accuracy of the maximum value Ap(OD)4 446 of OD4 436 (that is, the estimate of the OD peak amplitude 418 with a phase difference between the peak 418 center sample time 414 of ¼ sample time 412) is about 058, which is very close to the value Ap(OD)3 444.

Thus the APDC 120 of the present invention provides very good agreement for pulse peak amplitude as a function of phase difference between the sampling times 412 and the occurrence of amplitude peaks for both ID and OD signals having a considerable difference in pulse widths.

The averaging of the samples Y(i), Y(i−1) provides the benefits of reduced sensitivity to sampling phase differences discussed above that are desired.

Compensation for variation of amplitude is provided by cooperation with additional system functions described below.

With regard to section 122 of FIG. 5 of the present invention compared to application Ser. No. 09/132,962, it is seen that circuit elements for determining the peak pulse amplitude instance are the same for both. Namely, COMPx 690, COMPt 673, DT1 681, DT3 698, DT4 699, Dt5 162, inverter 700, 3 input AND 694, and Dt6 164.

The description of the operation of the AP of the present invention is similar to portions of Ser. No. 09/132,962 (page 24, line 11 to page 26 line 17) which is repeated here, with the understanding that values of X(i) in the present invention are the averaged values of Y(i) and Y(i−1) in contrast to those of Ser. No. 09/132,962 which are single sample values. Some corrections of prior typographic anomalies have been made in the present transcription. Some element names have been changed slightly to conform to the present Figures, element reference numbers for co-existing elements remain the same. Reference to peak amplitude instance PKDET from Ser. No. 09/132,962 has been replaced by reference to a preliminary peak amplitude instance PKDETp in the present invention at output Dtpp 697.

A DC threshold level TH 672 from an output of a threshold register (not shown) is provided from the DDCS to compensate for system variation as referenced above. The threshold level ran 672 is chosen to disable the generation of peak detection until the peak amplitude of the data pulse signals Psj reach an acceptable level. The actual value for TH 672 will depend on the particular system and environment being considered.

The threshold level 672 is preferably part of the feedback loop to compensate for the variations in pulse signal amplitude as a result of the averaging process provided by the averaging section 121.

When the magnitude of [X2(k)−TH] is greater than 0, COMPt 673 will output 680 a logic one level to a first Delay bit DT1 681 that is clocked by SYSCLK. DT1 681 feeds a second Delay bit DT2 689 having an output Dt2 691. Output Dt2 691 drives one input 692 of a three-input AND gate, 3AND 694.

REG2 661 holds a value Ep'j of a preliminary estimate of the peak amplitude Apj, which approximates a peak of particular pulse Psj, two clock ticks k after the last X(i) value is sampled by the ADC 626 and there is a peak detected, i.e. at; X(k−4)>X(k−3) and X(k−4)>X(k−5) corresponding to X2≧X3 and X2>X1 from Eq. 1 above.

The comparator COMPt 673 receives the REG2 632 output X2(k) 670 at one input and the DC threshold level TH 672 from the output of a threshold register (not shown) from the DDCS to compensate for system variation as described above. The threshold level TH 672 is chosen to disable the generation of peak detection until the peak amplitude of the data pulse signals Psj reach an acceptable level. The actual value for TH will depend on the particular system and environment being considered.

When the magnitude of [X2(k)−TH] is greater than 0, COMPt 673 will provide at output 680 a logic one level to a first Delay bit Dt1 681 that is clocked by SYSCLK. Dt1 681 feeds a second delay bit Dt2 689 having an output Dt2 691. Output Dt2 691 drives one input 692 of a three-input AND gate, 3AND 694.

A second comparator COMPx 690 receives the output X2(k) 635 of REG2 632 at one input 682 of COMPX1 690 and the output X3, k 634 of REG3 631 at another input of COMPX2 690. When the magnitude of [X3, k−X2(k)] is greater than 0, COMPx 690 outputs a logic one level at its output COMPx 685 to one input of third Delay bit Dt3 698. Dt3 698 feeds a fourth Delay bit Dt4 699 and an input 686 of an inverter Invert 700. Inverter Invert 700 feeds a second input 687 to 3AND 694. Dt4 699 feeds a third input 688 to 3AND 694. Both Dt3 698 and Dt4 699 and Both Dt1 681 and Dt2 689 transfer respective input levels to outputs level with a delay of one clock tick k when clocked by SYSCLK.

3AND 694 will output a logic one level at output 3AND output 695 when all three 3AND 694 inputs are logic true. 3AND output 695 feeds a peak detect Delay bit Dp 696 that is clocked by SYSCLK at each clock tick k. Dp 696 outputs 697 a logic one level one clock tick later than a one level on 3AND output 695.

The output of COMPt 673 at each clock tick k, is the logic value of |X2(k)>TH|, i.e. a logic one when X2 635 at clock tick k is greater than TH 672. If the value of X2 635 is not greater than the TH 672 level, then a zero will be propagated through Dt1 681 and Dt2 689 so that, 2 clocks later the 3AND 694 will be disabled and no peak will be detected.

This ensures that low-level noise is not interpreted as an actual pulse detect. When X2>TH, then the 3AND 694 will be enabled two clocks later, in time for Delay bit Dp 696 to output a valid peak detect level, if one has been detected.

The output PKDETP 697 of Dp 696 is:

$$[INV(Dt3)]AND[Dt4]AND[Dt2](k)-1 \text{ at clock}=k-1; \quad \text{Equation 9}$$

Where;

$$Dt2(k)=[COMPt(k-2)]=[X2(k-2)]>[TH]=[x(k-4))]>[TH] \quad \text{Equation 10}$$

$$COMPx, k=[X2(k)]>[X3(k)]; \quad \text{Equation 11}$$

$$[Dt4(k)]=[COMPX(k-2)]=[X2(k-2)]>[X3(k-2)]=[x(k-4))]>[x(k-3))]; \quad \text{Equation 12}$$

$$[Dt3]=COMPX(k)-1=[x(k-3))]>[X(k-2]; \quad \text{Equation 13}$$

The logical peak detect level PKDETP 697 is true when:

$$Dp=[INV[[X(k31\ 4)]>[x(k-3))]]] \text{ 3AND } [[X(k)-5)]>[x(k-1))]] \text{ 3AND } [[X(k)-5)]>[TH]]; \quad \text{Equation 14}$$

It is understood that the circuit of FIG. 5 may use registers REG3 631, REG2 632, REG1 633 to store the values from waveforms of FIG. 4. The comparator COMPx 690 in combination with the delay of the Delay bit Dt3 698 and the inverter Invert 700 provides both the result of X2>X1 and X2>X3 by making the comparison X3≧X2 and inverting it at Invert 700 which yields the desired X2>X3. The delay of the X2>X1 comparison by the Delay bit Dt4 699 allows both the necessary comparisons to be applied to the AND gate 3AND 694 at the same time.

FIG. 5 of the present invention and the signs of the equations 1, 2, 3 and 4 above are described in terms of positive pulses and positive logic. The operation of the invention is equally valid for negative going pulses and negative logic with appropriate adjustment for sign.

The APDC 120 circuit will be recognized as a pipeline processing circuit that takes advantage of reusing the same circuitry again and again in different clock cycles for different computations. The results of computations in one cycle are stored and combined with results of computation with the same or different circuit elements in other cycles.

An alternate embodiment of the present invention is contemplated in which the logic blocks |SUB|/8 651 and ADDER1 657 are replaced by logic blocks (not shown) that can compute the more accurate estimate of Epj, given by Equation 3 of Ser. No. 09/132,962. The necessary modifications of the connections and internal logic elements of the blocks |SUB|/8 651 and ADDER1 657 to achieve the above result are within the capability of a circuit engineer having ordinary skill in art.

An Offset Compensation and Scale Factor Compensation circuit section 123 is included in the APDC 120 embodiment of the present invention. Section 123 provides all of the compensation of pulse amplitude offset (∃) for the peak pulse estimates Epj of gray code peak pulse amplitudes Apj that are output at Gray code amplitude output 662*a*. Section 123 includes registers REG6 150, REG7 152, REG8 154, REG9 156, REG10 172 and REG11. Also included are delay bits Dt5 162, Dt6 164, Dt7 697*a*, two multipliers M*½A 170 and M*½B 172, and a 3-input ADDER3 173.

At clock k, REG6 150 receives the preliminary estimate value Ep'j(k) of Apj for Gray code pulses from the output 662 of REG5 661. REG6 150 output 151 drives an input of REG7 152 with a one clock delay, as does REG7 152 output 153 drive an input of REG8 154, REG8 154 output 155 drive an input of REG9 156, REG9 156 output 157 drive an input of the multiplier M*½B 172. Each output 151, 153, 154, 156 outputs the value of Ep'j(k−1) when the preceding output is Ep'j(k). That is, its output has the value of Ep'j one clock earlier. After four clocks, the respective outputs 157, 155, 153, 151, and 662 output the corresponding values Ep'j(k), Ep'j(k+1), Ep'j(k+2), Ep'j(k+3), Ep'j(k+4). The input INa is connected to output 153 and receives the value Ep'j(k+3). The input INb is connected to output 159 and receives the output of multiplier M*½B 172, that is the value ½*Ep'j(k). The input INc is connected to the output of M*½A 170 and receives the value Ep'j(k+5)*½. The ADDER2 173 performs the function INa-INb-INc and outputs the result; in this case Ep'j(k+3) −½*Ep'j(k) Ep'j(k+5)*½.

Since any offset P, adding to the pulse amplitudes Ep'j (k+3), Ep'j(k), Ep'j(k+5) will appear equally in all three values input to the ADDER2 173 function, the output of ADDER2 173 at 662*a* will have the offset, β, removed. When the clock, k+3 is the clock near the peak Apj, Ep'j(k+3) will be much larger than either of the other two and the value Epj of the output at 662*a* will be large.

Thus it is apparent that the method and system of this aspect of the present invention provides a simple, relatively low cost and area efficient removal of offset for: the Gray code data pulses.

With regard again to FIG. 5, PES preliminary pulse peak amplitude data, Ep'j, is output from the same REG7 152 output 153 as the Gray code data pulses. Ep'j however bypasses the offset removal portion of section 123 (REG8 154, REG9 156, M*½B 172 and ADDER2 173) and passes directly to the register REG11 162*b* to be output in phase with the PKDET signal from Dt7 697*a*.

Figure 7:
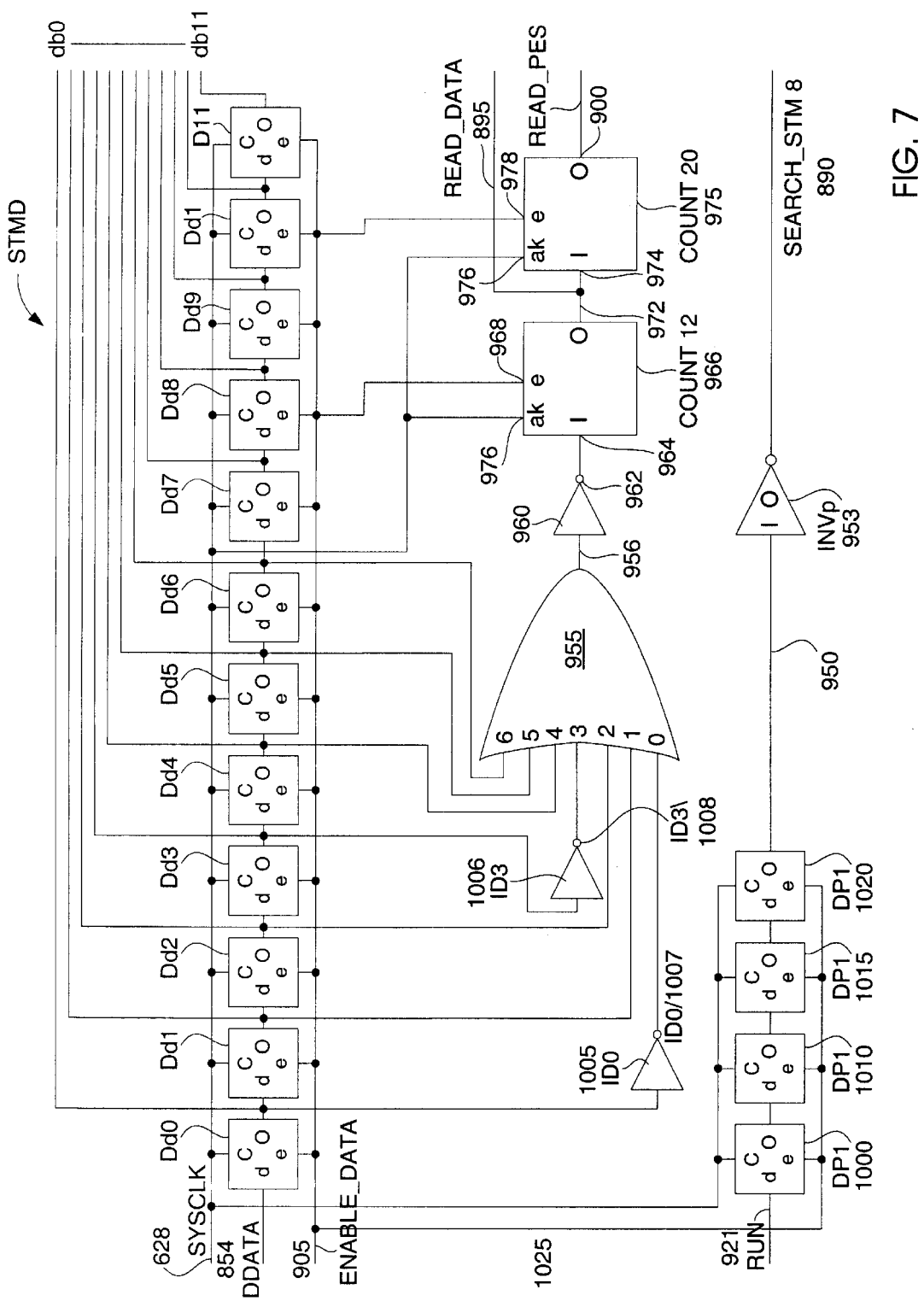
FIG. 7 shows a schematic block diagram of an STM detector circuit.
Figure 8:
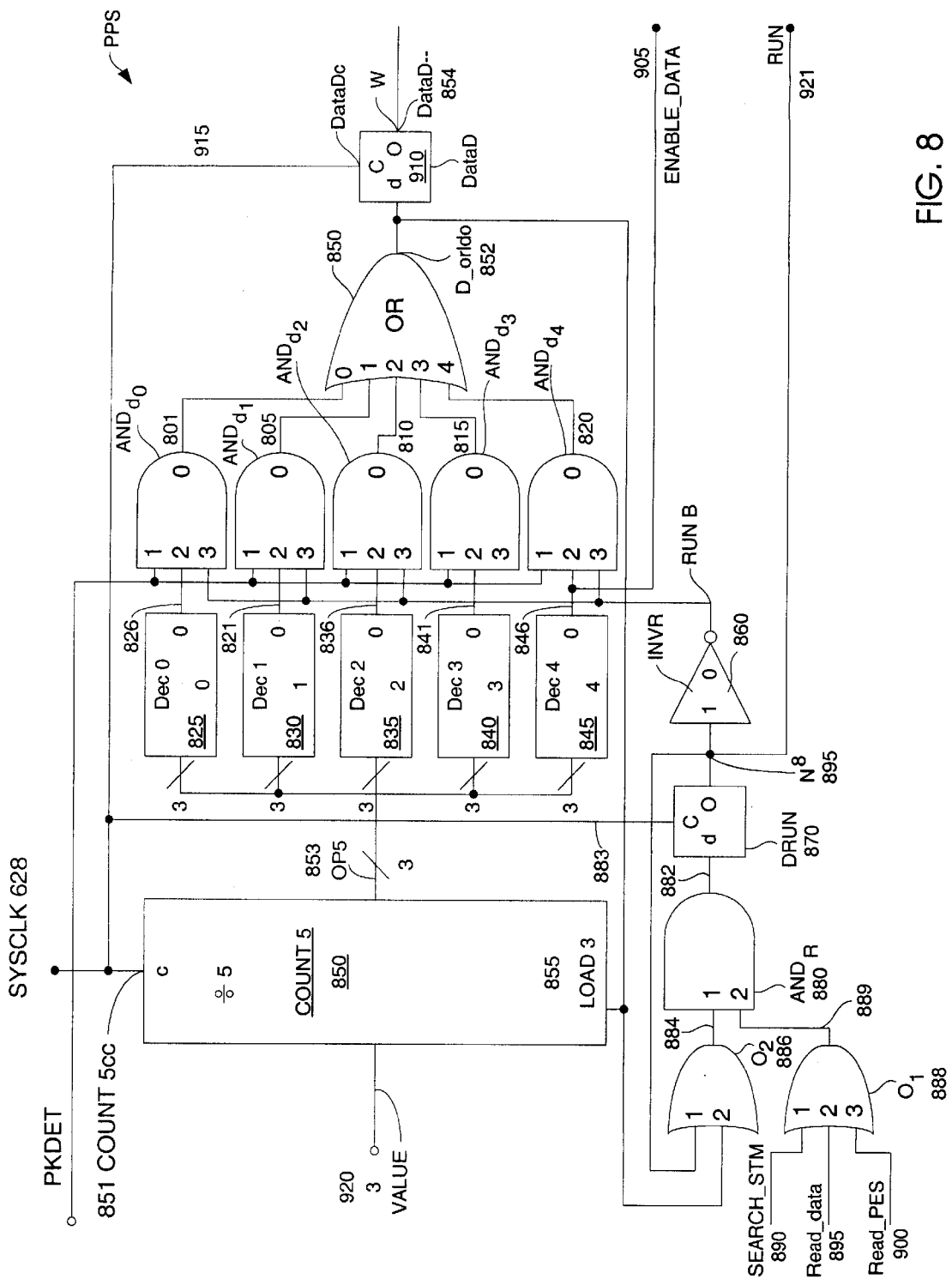
FIG. 8 illustrates a schematic block diagram of a PPS circuit used in conjunction with the APDC of the present invention.

Operation of the APDC 120 of the present invention in the system 100 proceeds as in Ser. No. 09/132,962 in cooperation with the STMD and PPS circuits of FIG. 7 and FIG. 8 thereof with the additional requirement that the system 100 be adapted to the separate PES amplitude output from REG11 162*b*.

With regard to the PPS and STMD circuits from the disclosure of Ser. No. 09/132,962 and the servo sector architecture of thereof, the STMD signals (dbo–db11, READ_DATA 895, READ_PES 900, DP1, DP2, DP3, DP4) in combination with a suitable receiving DPS or FPGA circuit may be driven thereby for detecting which pulses are Gray code i.e., track (T) and sector (S) ID and which are PES pulses. The design of suitable logic circuitry in a DPS or FPGA 901 to accept the PKDET signal 697, PES Epj peak amplitude 662*b*, Gray code Epj peak amplitude 662*a*, and the cooperating STMD signals of Ser. No. 09/132,962 in order to derive scale factor adjustment signals (not shown) for the Gray code peak amplitude 662*a* and offset removal (not shown) for PES peak amplitude signals 662*b* is within the capability of one having ordinary skill in the art of digital circuit design.

In one preferred embodiment of the present peak detect invention, it is assumed an inexpensive 10 bit 50 MHz ADC 626 is available for the ADC 626, that the servo pit time will be 100 ns corresponding to a 10 MHz signal and the servo signal is high pass filtered with a high pass −3 dB point, of below 5000 Hz such that the sag over a 1 microsec servo sector is at worst a few percent of the signal amplitude.

An alternate embodiment of the present invention is contemplated in which the logic blocks SUM1 651 and ADDER1 657 compute the more accurate estimate of Epj, given by Equation 3 above. The necessary modifications of the connections and internal logic elements of the blocks SUM1 651 and ADDER1 657 to achieve the above result are within the capability of a circuit engineer having ordinary skill in the art.

It is expected that the actual determination of the threshold value for the APDC 120, the PES computation and the Gray code detection and decoding will be done in a DSP or FPGA. Seven gate signals (STM, A, B, C, D, S and T) may be used by the DSP to determine when the PES SAMPLE AMPLITUDE or GRAY CODE AMPLITUDE values can be read. The DSP may use the STM amplitude to determine the threshold using some fraction of a low pass filtered amplitude signal (not shown) summed from previous servo sectors. The DSP may use the PES amplitudes corresponding to the above signals and stored values of A, B, C, and D peak amplitudes to calculate (A-B)/C-D). The DSP or FPGA may use the Gray code amplitudes corresponding to S and T to decode the digital values of track and sector address. A logic one would be recognized if the amplitudes of the S or T signals is greater than a calculated threshold value.

For example, DSP registers (not shown) for storing peak amplitude data from the STMD pulses, the A, B, C, and D, PES pulses, and the Gray code S and T pulses may be defined in the FPGA. A straight forward calculation in the FPGA (not shown) of (A-B)/(C-D), that is the ratio of the differences between A and B divided by the difference between C and D yields a PES signal insensitive to offset or scaling factor.

The actual determination of TH may be computed by a DSP or FPGA and supplied to the APDC threshold input from other circuit functions as is known in the art. For example, peak pulse amplitudes Apj from the STM pulses received by the system 100 from the output 662 from consecutive sectors 212 may be low pass filtered and used as an input to a threshold calculating block (not shown) computing the threshold value Th as $$Th = Ap(\text{ave})/2$$

$$Ap(\text{ave}) = \Sigma_{Ns} Apj(n)/Ns$$

Figure 9:
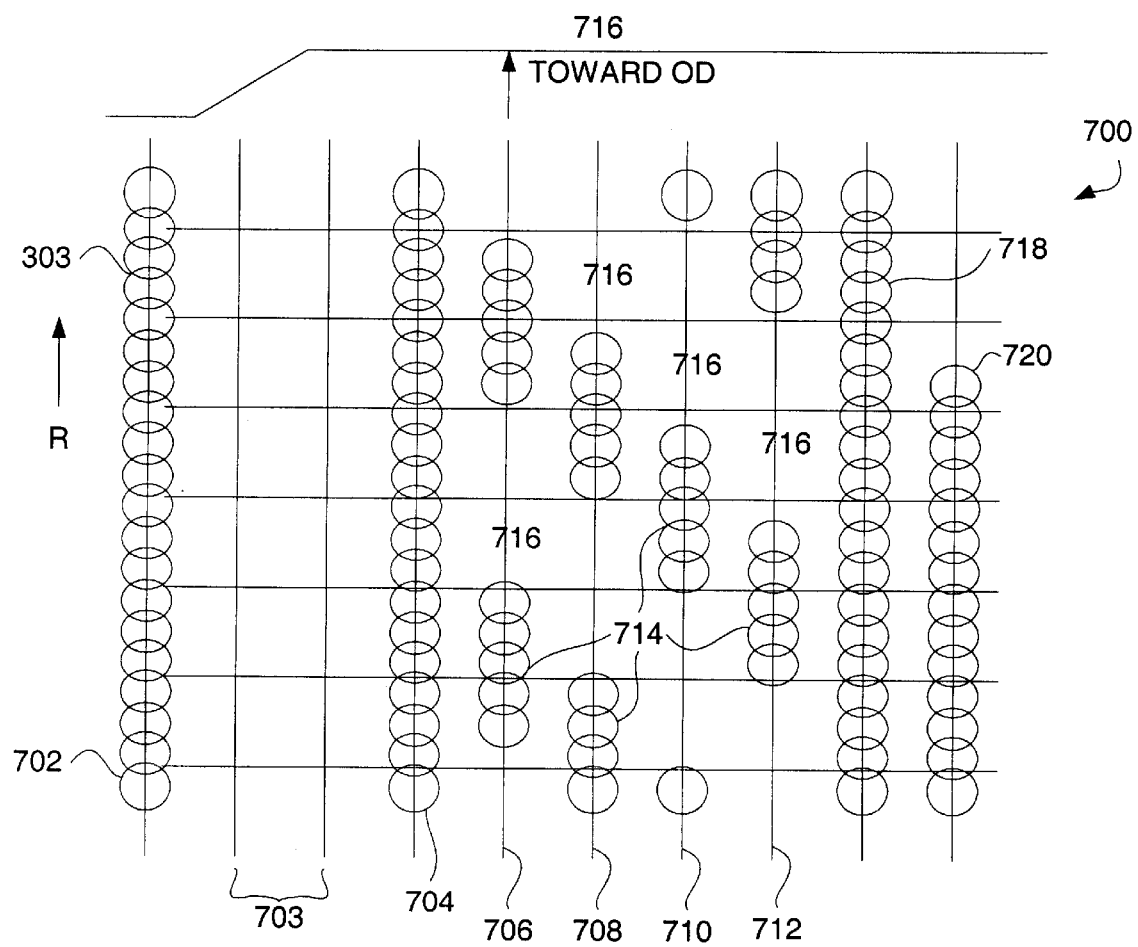
FIG. 9 depicts a detailed view of an alternative servo sector architecture for an alternative embodiment of the present invention used in the system of FIG. 1.
Figure 10:
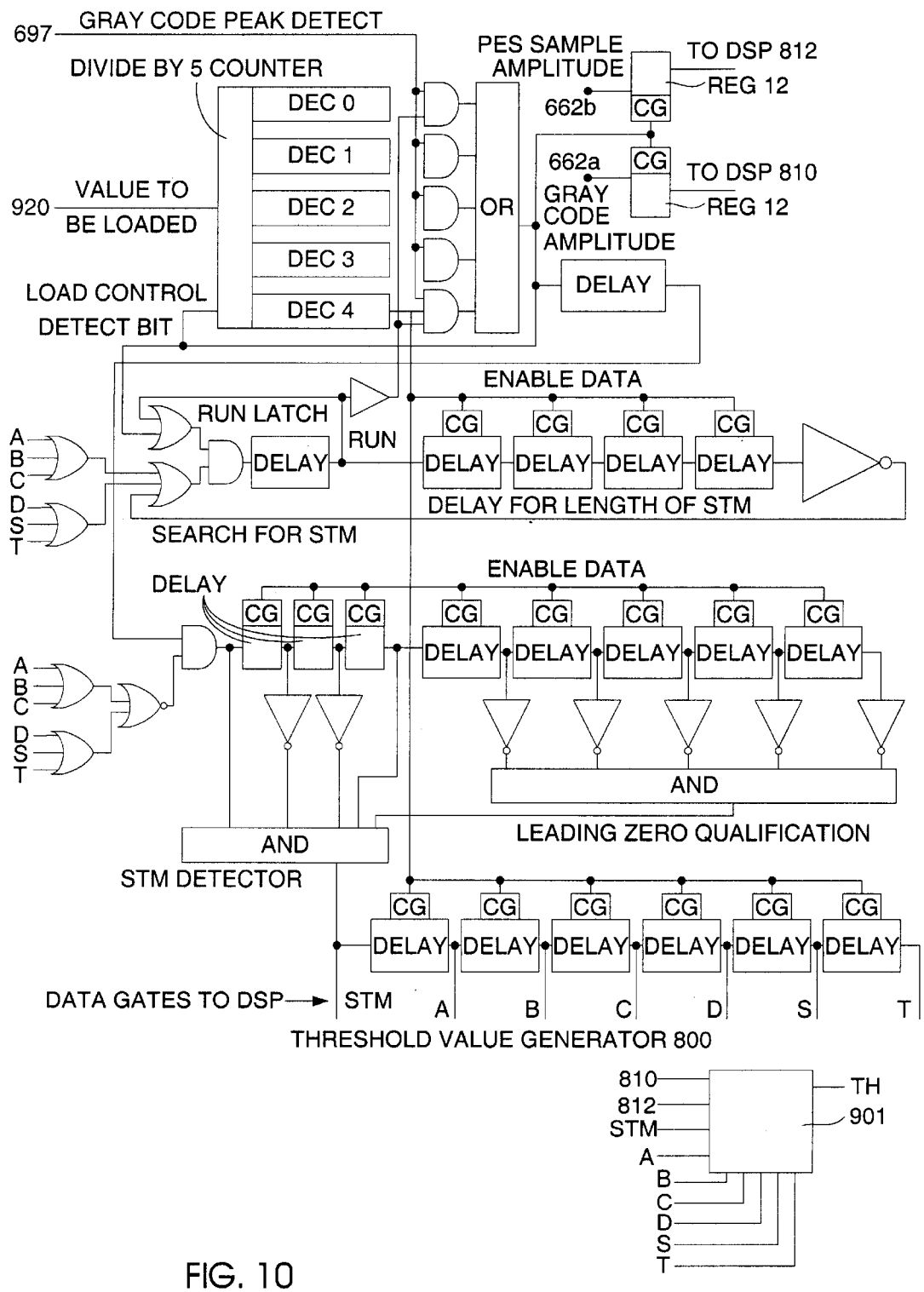
FIG. 10 illustrates an STM detector and a threshold generator circuit.

With regard to FIG. 9 and FIG. 10 there are shown schematics of an alternate Servo Sector Pattern 700 and Threshold Value Generator 800. Pattern 700 is designed to work in cooperation with the APDC 120 of the present invention and the Generator 800 in combination with DSP 901.

The Servo Sector Pattern 700 includes a four-bit STM pattern formed of first and fourth spaced apart continuous radial lines (radial bar) 702 and 704 of overlapping pits 303. Radial bars 702 and 704 are spaced apart by two blank bars 703 (i.e., no bits encoded). Immediately following the bar 704 are four succeeding segmented circumferential PES patterns 706, 708, 710, and 712. The PES patterns 706, 708, 710, and 712 are formed of contiguous overlapping pits 303 grouped into segments 714 and spaces 716 staggered radially following the sequence of the patterns 311–314.

The PES patterns are followed immediately in turn, by Sector ID bit (Sb) 718 and Track ID bit (Tb) 720. Track and Sector ID numbers (not shown) are encoded as the bit 714 and bit 716 of a plurality of sequential servo sectors 212.

Circumferential lengths, Ls, of the patterns 706–720 are arranged in an encoding scheme (not shown) typical of that in the art.

The circuit 800 incorporates the function of the PPS circuit of Ser. No. 09/132,962 combined with the function of the STMD circuit. Minor changes in the counting logic of circuit 800, familiar to those skilled in the art of digital arithmetic, are made to accommodate the single bit PES patterns 706–710. Circuit 800 accepts the Gray code peak detect signal 697 along with the Gray code amplitude signals 662*a* and PES amplitude 662*b* signals from the APDC 120 and computes and outputs Gray code amplitude values 810 and PES amplitude values 812 to DSP 901.

DSP 901 (or alternatively an FPGA) provides sufficient digital gates (not shown) configured for implementing some or all of the digital functions shown and described with regard to the Figures and Description herein.

It is to be understood that the above description is illustrative only and not limiting of the disclosed invention.

It will be appreciated that it would be possible to modify the size, shape and appearance and methods of manufacture of various elements of the invention or to include or exclude various elements within the scope and spirit of this invention. For example, although an optical disk drive embodiment has been described, the present invention is applicable to detection of signals in magnetic disk drives also. Thus the invention is to be limited only by the claims as set forth below.

What is claimed:

1. A method of digitally processing asynchronously sampled analog data in a disk drive, comprising the steps of:
    averaging two adjacent samples taken from an analog data signal;
    estimating a peak amplitude of the data signal based on the average of the two adjacent samples;
    subtracting a measured base line value from the estimated peak amplitude to obtain a new estimated peak amplitude;
    using position error pattern signals obtained from a disk in the disk drive to generate a position error signal difference A-B and a maximum peak amplitude signal difference C-D, wherein A, B, C, and D are stored data points representing peak amplitudes from Servo Timing Mark Detector pulses; and
    dividing the A-B signal by the C-D signal to generate a normalized position error signal (A-B)/(C-D) to compensate for systematic changes in the data signal.

2. The method of claim 1, further comprising the step of multiplying the new peak amplitude by a constant whose value is known.

3. The method of claim 1, further comprising the steps of:
    comparing the new estimated peak amplitude to a threshold value that is known; and
    determining whether a bit value representing the data signal is a zero or a one based on the result of the comparing step.

4. The method of claim 3, further comprising the step of estimating the base line value by using ½ times a sample value taken before the peak amplitude and ½ times a sample value after the peak amplitude.

5. The method of claim 3, further comprising the step of setting a threshold value to be ½ times the maximum peak amplitude taken from a plurality of data signals.

6. In a disk drive system having an output providing an analog signal including a sequence of analog signal data pulses, DPS(j), recovered from stored data on a storage disk, the data pulses having pulse widths greater than about width Pw, peak magnitudes of about Ap(j) deviating from a respective base line and respective peak instances of tp(j), the base line having a base line offset value E from a zero reference level, a digital peak detection channel comprising:
    an analog input of a sampling device receiving continuous analog values of the sequence of analog signal data pulses DPS(j), the sampling device being responsive to a sampling clock by sampling values y(k) of said analog signal data pulses DPS(j) at each of successive sample clock times - - - , (k−2), (k−1), k, (k+1), (k+2), - - - and converting each said analog value y(k) to a corresponding digital value - - - , Y(k−2) Y(k−1), Y(k), Y(k+1), Y(k+2), - - - , the sample clock having a sample period of less than Pw/5;
    a digital output of the sampling device outputting said sampled digital values - - - , Y(k−2), Y(k−1), Y(k), Y(k+1), Y(k−2), - - - , to an input of a digital sample value averaging device, the sample value averaging device providing an output of successive digital sample average values X(k−1), X(k), X(k+1), - - - in which each digital sample average value X(k) is formed from a sequence of 2 adjacent samples, Y(k−1), Y(k), and is equal to [Y(k)+Y(k−1)]/2;
    a peak pulse instance recognition device receiving the output of 3 successive sample average values X(k), X(k−1), X(k−2) and providing a digital peak detect output (Pkdet) with a logic signal level at a true logic value when the logic value ((X(k−1)>X(k) AND (X(k−1)>X(k−2)) is true, whereby the true logic value of the digital peak detect output indicates a signal pulse peak value, Ap(j)(k), that occurred within plus or minus one sampling period of the sampling time k.

7. The disk drive system of claim 6, which the three successive average values X(k−2), X(k−1), X(k) are output to corresponding registers REG1, REG2, REG3 that provide corresponding outputs X1, X2, X3;
    a comparator is coupled to said registers, said comparator providing the peak detect output (Pkdet) with a logic signal level at a true logic value when the logic value ((X2>X1) AND (X2>X3)) is true,
    whereby a peak, Ap(j), of a data pulse, j, is indicated to have occurred between the sample period k minus one period and the sample period k plus one period.

8. The disk drive system of claim 6, including a data pulse peak amplitude estimator, comprising:
    computing means for computing an estimate Ep(j), of pulse peak amplitude Ap(j) of a pulse, j, having peak Ap(j), detected by a true logic value on the peak detect output.

9. The disk drive system of claim 8, in which a first estimate Ep'(j) of estimate Ep(j) is computed from an algorithm Ep'(j)=X2+|X1−X3|/8 in which X2 is the center average sample of the three adjacent average samples X1, X2, X3;
    a connection providing the estimate Ep(j) to the disk drive system.

10. The disk drive system of claim 8, which a base line offset β measured from a zero reference level to a pulse base line is removed from the first estimate Ep'j by an offset removal filter.

11. The disk drive system of claim 10, in which the offset removal filter is a finite input response filter function.

12. The disk drive system of claim 11, in which the finite input response filter function replaces the value of Ep'j(k) with Ep*j=Ep'j(k)−½[Ep'j(k−2)+Ep'j(k+2)],
    whereby ½ of common offset values β in each of the estimates Ep'j(k−2) and Ep'j(k+2) are subtracted from the value of Ep'j(k) to cancel the offset β in the center estimate Ep'j(k).

13. The disk drive of claim 12, which E offset corrected values of Ep'j(k) are provided to one or more corresponding inputs of a general logic gate assembly as the E corrected peak amplitude estimate of pulses selected from the group of gray code pulses of a servo sector, the position-error-sensing, PES, pulses of a servo sector and the servo-timing-mark, STM, pulses of a servo sector.

14. The disk drive of claim 12, in which the general logic gate assembly is a digital signal processing, DSP, integrated circuit.

15. The disk drive system of claim 14, including a pulse signal threshold setting device, comprising:
    an input to the DSP receiving estimated peak servo-timing-mark, STM, pulse values from a sequence of sectors;

an algorithm implemented by said DSP providing a signal threshold value computed from said estimated peak STM pulse values received from said sequence of sectors.

16. The disk drive system of claim 15 in which the algorithm is ½ of the average value of the estimated peak STM pulse values received from said sequence of said sectors.

17. The disk drive system of claim 6, comprising:

a plurality of circumferentially spaced apart servo sectors having said servo sectors structure comprising:

at least four bit servo-timing-marks, STM, pattern per servo sector;

at least one position-error-sensing, PES, pattern per servo sector for each of A, B, C, and D, wherein A, B, C, and D are data points representing peak amplitudes from servo-timing-mark Detector pulses;

at least one sector number pattern per servo sector;

at least one track number pattern per servo sector;

computing means for computing (A-B)/(C-D) for each servo sector, from estimated values of peak amplitudes of pulses from said A, B, C, and D PES patterns in said servo sector.

* * * * *